United States Patent [19]
Tsutsui et al.

[11] Patent Number: 5,765,126
[45] Date of Patent: Jun. 9, 1998

[54] METHOD AND APPARATUS FOR VARIABLE LENGTH ENCODING OF SEPARATED TONE AND NOISE CHARACTERISTIC COMPONENTS OF AN ACOUSTIC SIGNAL

[75] Inventors: Kyoya Tsutsui; Mito Sonohara, both of Kanagawa, Japan

[73] Assignee: Sony Corporation, Tokyo, Japan

[21] Appl. No.: 392,756

[22] PCT Filed: Jun. 29, 1994

[86] PCT No.: PCT/JP94/01056

§ 371 Date: Apr. 17, 1995

§ 102(e) Date: Apr. 17, 1995

[30] Foreign Application Priority Data

Jun. 30, 1993 [JP] Japan ................................. 5-183322

[51] Int. Cl.⁶ ...................................................... G10L 7/06
[52] U.S. Cl. ........................ 704/206; 704/268; 704/269; 704/500
[58] Field of Search ................... 395/2.14, 2.15, 395/2.17, 2.29, 2.67, 2.77, 2.78; 704/205, 206, 208, 220, 258, 268, 269, 500

[56] References Cited

U.S. PATENT DOCUMENTS

| | | | |
|---|---|---|---|
| 3,973,081 | 8/1976 | Hutchins | 704/230 |
| 4,184,049 | 1/1980 | Crochiere et al. | 704/229 |
| 4,455,649 | 6/1984 | Esteban et al. | 370/522 |
| 4,535,472 | 8/1985 | Tomcik | 704/229 |
| 4,748,579 | 5/1988 | Zibman et al. | 364/726.03 |

(List continued on next page.)

FOREIGN PATENT DOCUMENTS

| | | | |
|---|---|---|---|
| 0145788 A1 | 6/1985 | European Pat. Off. | H04B 12/02 |
| 0255111 A2 | 2/1988 | European Pat. Off. | G11B 20/10 |
| 0289080 A1 | 11/1988 | European Pat. Off. | H04B 1/66 |
| 0338781 A2 | 10/1989 | European Pat. Off. | G11B 20/18 |
| 0348132 A2 | 12/1989 | European Pat. Off. | G11B 20/18 |
| 0409248 A2 | 1/1991 | European Pat. Off. | H03M 7/30 |
| 0420745 A2 | 4/1991 | European Pat. Off. | H04B 1/66 |
| 0421259 A2 | 4/1991 | European Pat. Off. | H04B 1/66 |
| 0424016 A2 | 4/1991 | European Pat. Off. | H04B 1/66 |
| 0428156 A2 | 5/1991 | European Pat. Off. | H03M 7/30 |
| 0506394 A2 | 9/1992 | European Pat. Off. | G10L 7/00 |
| 0516342 A2 | 12/1992 | European Pat. Off. | G11B 27/00 |
| 0525809 A2 | 2/1993 | European Pat. Off. | H04B 1/66 |
| 61-201526 | 9/1986 | Japan | H04B 14/00 |
| 63-110830 | 5/1988 | Japan | H04B 14/06 |

(List continued on next page.)

OTHER PUBLICATIONS

Daniel W. Griffin and Jae S. Lim, "A High Quality 9.6 kbps Speech Coding System", Proc. IEEE ICASSP '86, pp. 125–128, Apr. 1986.

Daniel W. Griffin and Jae S. Lim, "Multiband Excitation Vocoder", IEEE Trans. Acoustics, Speech, and Signal Processing, vol. 36, No. 8, pp. 1223–1235, Aug. 1988.

Paul C. Meuse, "A 2400 bps Multi-Band Excitation Vocoder", Proc. IEEE ICASSP '90, session S1.3, pp. 9–12, Apr. 1990.

(List continued on next page.)

*Primary Examiner*—David R. Hudspeth
*Assistant Examiner*—Talivaldis Ivars Šmits
*Attorney, Agent, or Firm*—Limbach & Limbach L.L.P.

[57] ABSTRACT

A signal encoding apparatus for encoding an acoustic signal. This signal encoding apparatus includes a transform circuit for transforming an inputted acoustic signal into frequency components, a signal component separating circuit for separating an output of the transform circuit into tone characteristic components and noise characteristic components, a tone characteristic encoding circuit for encoding a signal of tone characteristic components, and a noise characteristic component encoding circuit for encoding a signal of noise characteristic components, wherein the tone characteristic component encoding circuit encodes respective signal components of the signal of tone characteristic components so that they respectively have different code lengths to thereby improve efficiency of encoding without degrading sound quality with respect to acoustic signal of tone characteristic.

35 Claims, 13 Drawing Sheets

U.S. PATENT DOCUMENTS

| | | | |
|---|---|---|---|
| 4,827,336 | 5/1989 | Acampora et al. | 348/396 |
| 4,896,362 | 1/1990 | Veldhuis et al. | 704/229 |
| 4,912,763 | 3/1990 | Galand et al. | 704/230 |
| 4,932,062 | 6/1990 | Hamilton | 704/233 |
| 4,972,484 | 11/1990 | Theile et al. | 704/227 |
| 5,049,992 | 9/1991 | Citta et al. | 348/443 |
| 5,081,681 | 1/1992 | Hardwick et al. | 704/268 |
| 5,109,417 | 4/1992 | Fielder et al. | 704/205 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 348/415 |
| 5,142,656 | 8/1992 | Fielder et al. | 704/229 |
| 5,151,941 | 9/1992 | Nishiguchi et al. | 704/233 |
| 5,157,760 | 10/1992 | Akagiri | 704/233 |
| 5,166,686 | 11/1992 | Sugiyama | 341/155 |
| 5,185,800 | 2/1993 | Mahieux | 704/500 |
| 5,222,289 | 6/1993 | Fielder | 704/229 |
| 5,226,084 | 7/1993 | Hardwick et al. | 704/219 |
| 5,243,588 | 9/1993 | Maeda et al. | 369/54 |
| 5,244,705 | 9/1993 | Tsurushima et al. | 428/64.4 |
| 5,294,925 | 3/1994 | Akagiri | 341/50 |
| 5,301,205 | 4/1994 | Tsutsui et al. | 375/200 |
| 5,311,561 | 5/1994 | Akagiri | 375/240 |
| 5,367,608 | 11/1994 | Veldhuis et al. | 704/229 |
| 5,375,189 | 12/1994 | Tsutsui | 704/229 |
| 5,381,143 | 1/1995 | Shimoyoshi et al. | 341/51 |
| 5,388,209 | 2/1995 | Akagiri | 704/229 |
| 5,416,604 | 5/1995 | Park | 358/433 |
| 5,438,643 | 8/1995 | Akagiri et al. | 704/201 |
| 5,471,558 | 11/1995 | Tsutsui | 704/219 |
| 5,490,170 | 2/1996 | Akagiri et al. | 375/240 |
| 5,623,557 | 4/1997 | Shimoyoshi et al. | 704/229 |
| 5,634,082 | 5/1997 | Shimoyoshi et al. | 704/229 |

FOREIGN PATENT DOCUMENTS

| | | | |
|---|---|---|---|
| 3-109824 | 5/1991 | Japan | H03M 7/30 |
| 3-117919 | 5/1991 | Japan | H03M 7/30 |
| 3-132217 | 6/1991 | Japan | H03M 7/30 |
| 3-139922 | 6/1991 | Japan | H03M 7/30 |
| 3-256411 | 11/1991 | Japan | H03M 7/30 |
| 3-263925 | 11/1991 | Japan | H03M 7/30 |
| 5-114888 | 5/1993 | Japan | H04B 14/06 |
| 6-29934 | 2/1994 | Japan | H04B 14/06 |
| 6-149292 | 5/1994 | Japan | G10L 9/08 |

OTHER PUBLICATIONS

Hisham Hassanein, Andre Brind'Amour, and Karen Bryden, "A Hybrid Multiband Excitation Coder for Low Bit Rates", IEEE International Conference on Selected Topics in Wireless Communications, Vancouver, BC, Canada, Jun. 1992.

Michael S. Brandstein, Peter A. Monta, John C. Hardwick, and Jae S. Lim, "A Real-Time Implementation of the Improved MBE Speech Coder", Proc. IEEE ICASSP '90, session S1.2, pp. 5–8, Apr. 1990.

J. Rothweiler, "Polyphase Quadrature Filters—A New Subband Coding Technique," ICASSP 83 Proceedings, vol. 3 of 3, Apr. 14–16, 1983, pp. 1280–1283.

R. Crochiere et al., "Digital Coding of Speech In Sub-Bands," The Bell System Technical Journal, vol. 55, No. 8, Oct. 1976, pp. 1069–1085.

J. Princen et al., "Subband/Transform Coding Using Filter Bank Designs Based On Time Domain Aliasing Cancellation," ICASSP 87, vol. 4, Apr. 6–9, 1987, pp. 2161–2164.

R. Zelinski et al., "Adaptive Transform Coding Of Speech Signals," IEEE Transactions On Acoustics, Speech & Signal Processing, vol. ASSP-25, No. 4, Aug. 1977, pp. 299–309.

M. Krasner, "The Critical Band Coder—Digital Endoding Of Speech Signals Based On The Perceptual Requirements Of The Auditory System," IEEE, Apr. 1980, vol. 1–3, pp. 327–331.

K. Brandenburg et al., "ASPEC: Adaptive Spectral Entropy Coding of High Quality Music Signals," AES 90TH Convention, Feb. 19–22, 1991, pp. 1–11.

G. Davidson et al., "Low–Complexity Transform Coder For Satellite Link Applications," AES 89TH Convention, Sep. 21–25, 1990, Session–Paper F–I–6, pp. 1–22.

J. Johnston, "Transform Coding Of Audio Signals Using Perceptual Noise Criteria," IEEE Journal On Selected Areas In Communications, vol. 6, No. 2, Feb. 1988, pp. 314–323.

Y. Mahieux et al., "Transform Coding Of Audio Signals At 64 KBIT/S," IEEE Global Telecommunications Conference & Exhibition, Dec. 2–5, 1990, vol. 1 of 3, pp. 518–522.

E. Schroder et al., "High Quality Digital Audio Encoding With 3.0 Bits/Sample Using Adaptive Transform Coding," AES 80TH Convention, Mar. 4–7, 1986, pp. 1–7.

G. Stoll et al., "Masking-Pattern Adapted Subband Coding: Use Of The Dynamic Bit–Rate Margin," AES 84TH Convention, Mar. 1–4, 1988, pp. 1–33.

G. Theile et al., "Low Bit–Rate Coding Of High–Quality Audio Signals, An Introduction To The Mascam System," EBU Review/Technical, No. 230, Aug. 1988, pp. 158–181.

A. Sugiyama et al., "Adaptive Transform Coding With An Adaptive Block Size (ATC–ABS)," ICASSP 1990, vol. 2, Apr. 3–6, 1990, pp. 1093–1096.

M. Torres–Guijarro et al., "Improved Analysis/Synthesis Methods For The Multiband Excitation Coder," Mediterranean Electrotechnical Conference, Apr. 12–14, 1994, pp. 57–60.

D. Esteban et al., "Application Of Quadrature Mirror Filters To Split Band Voice Coding Schemes," ICASSP May 9–11, 1977, pp. 191–195.

B. Edler, "Coding Of Audio Signals With Overlapping Block Transform And Adaptive Window Functions," Frequenz, vol. 43, No. 9, Sep. 1989, pp. 252–256 (English Abstract).

| QUANTIZED VALUE | CODE |
|---|---|
| + 1 | 00 |
| + 2/3 | 100 |
| + 1/3 | 110 |
| + 0 | 1111 |
| − 1/3 | 1110 |
| − 2/3 | 101 |
| −1 | 01 |

FIG.20A

| QUANTIZED VALUE | CODE |
|---|---|
| + 1 | 1110 |
| + 2/3 | 1100 |
| + 1/3 | 100 |
| + 0 | 0 |
| − 1/3 | 101 |
| − 2/3 | 1101 |
| −1 | 1111 |

FIG.20B

METHOD AND APPARATUS FOR VARIABLE LENGTH ENCODING OF SEPARATED TONE AND NOISE CHARACTERISTIC COMPONENTS OF AN ACOUSTIC SIGNAL

This is related to co-pending application 08/374,518, filed Mar. 20, 1995 and entitled Method, Apparatus and Recording Medium for Coding Separated Tone and Noise Characteristic Spectral Components of an Acoustic Signal U.S. Pat. No. 5,717,821.

TECHNICAL FIELD

This invention relates to a signal encoding apparatus to which such an encoding of information such as digital signal data, etc. to efficiently encode a digital signal such as input digital data, etc. to transmit or record the encoded digital signal is applied, a signal recording medium adapted so that signals encoded by such signal encoding apparatus are recorded, and a signal decoding apparatus to which such a decoding of information such as digital data, etc. to decode an encoded signal reproduced from a recording medium as mentioned above or transmitted from a signal encoding apparatus as mentioned above to obtain a reproduction signal is applied.

BACKGROUND ART

Hitherto, there are various efficient encoding techniques for audio signals or speech signals, etc. As the representative thereof, there can be enumerated band division coding (Sub Band Coding (SBC)) which is non-blocking frequency band division system to divide an audio signal, etc. on the time base into signal components in a plurality of frequency bands every predetermined unit time without implementing blocking thereto to encode them, so called transform coding which is the blocking frequency band division system to divide a signal on the time base into blocks every predetermined unit time to transform respective signals on the time base into signals on the frequency base every respective blocks (spectrum transform processing) to divide signals transformed in this way into signal components in a plurality of frequency bands to encode them every respective frequency bands, and the like. Moreover, there has been also already proposed efficient coding technique in which the band division coding and the transform coding described above are combined. In this case, for example, a signal on the time base is divided into signals in a plurality of bands by the above-mentioned band division coding thereafter to spectrum-transform the signals every respective bands into signals on the frequency base to implement coding to the spectrum-transformed signals every respective bands.

Here, as a filter for the band division used in the above-mentioned band division coding technique, or the above-mentioned combined efficient coding technique, etc., there is a filter, e.g., so called QMF, etc. Such a filter is described in, e.g., 1976 R. E. Crochiere Digital coding of speech in subbands Bell Syst. Tech. J. Vol. 55, No. 8 1976.

Moreover, filter division technique of equal bandwidth is described in, e.g., ICASSP 83, BOSTON Polyphase Quadrature filters—A new subband coding technique Joseph H. Rothweiler.

Further, for the above-described spectrum transform processing, there is, e.g., such a spectrum transform processing to divide an input audio signal into blocks every predetermined unit time (frame) to carry out Discrete Fourier Transform (DFT), Discrete Cosine Transform (DCT) or Modified DCT Transform (MDCT), etc. every respective blocks thus to transform signals on the time base into signals on the frequency base. The above-mentioned MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

By quantizing signals divided every bands by filter or spectrum transform processing in this way, it is possible to control bands where quantizing noises take place, and to carry out more efficient coding from a viewpoint of the hearing sense by making use of the property of the masking effect, etc. Moreover, in this case, when an approach is employed to carry out normalization, every respective bands, e.g., by maximum value of absolute values of signal components in respective corresponding bands prior to implementation of quantization, further efficient coding can be carried out.

Moreover, as a technique for carrying out frequency band division by frequency division width for quantizing respective frequency components divided every frequency bands, there is carried out band division in which, e.g., the hearing sense characteristic of the human being is taken into consideration. Namely, there are instances where an audio signal is divided into signal components in plural (e.g., 25) bands by bandwidths such that bandwidths become broader according as frequency shifts to a higher frequency band side, which are generally called critical bands. In encoding data every respective bands at this time, encoding by predetermined bit allocation is carried out every respective bands, or encoding by adaptive bit allocation is carried out every respective bands. For example, in encoding coefficient data obtained after having undergone the above-mentioned MDCT processing by the bit allocation described above, encoding is carried out by adaptive allocation bit numbers with respect to MDCT coefficient data every respective bands obtained by the MDCT processing every respective blocks.

As the bit allocation technique, the following two techniques are known. Namely, e.g., in IEEE Transactions of Acoustics, Speech, and Signal Processing, vol. ASSP-25, No. 4, August 1977, bit allocation is carried out on the basis of magnitudes of signals every respective bands. In accordance with this system, quantizing noise spectrum becomes flat, and the noise energy becomes minimum. However, since masking effect is not utilized from a viewpoint of the hearing sense, actual noise sense is not optimum.

Moreover, e.g., in ICASSP 1980 The critical band coder—digital encoding of the perceptual requirements of the auditory system M. A. Kransner MIT, there is described a technique in which the hearing sense masking is utilized to obtain necessary signal-to-noise ratios every respective bands to carry out fixed bit allocation. With this technique, however, since bit allocation is fixed even in the case where characteristic is measured by sine wave input, characteristic value cannot take so good value.

In order to solve these problems, an efficient encoding apparatus in which all bits usable for bit allocation are used in the state divided into bits for fixed bit allocation pattern determined in advance every respective small blocks and bits for carrying out bit allocation dependent upon magnitudes of signals of respective blocks to allow its divisional ratio to be dependent upon a signal related to an input signal so that the divisional ratio to bits for the fixed bit allocation pattern becomes greater according as spectrum of the signal becomes more smooth is proposed in EUROPEAN PATENT APPLICATION, Publication number 0 525 809 A 2, Date of publication of application 03. 02. 93 Bulletin 93/05.

In accordance with this method, in the case where energies concentrate on a specific spectrum component like sine wave input, a greater number of bits are allocated to block including that spectrum component, thereby making it possible to remarkably improve the entire signal-to-noise characteristic. Since the hearing sense of the human being is generally extremely sensitive to a signal having a sharp spectrum component, improving the signal-to-noise characteristic by using such a method not only results in improvement in numeric value in measurement, but also is an effective improvement in sound quality from a viewpoint of the hearing sense.

A large number of methods have been proposed in addition to the above-mentioned bit allocation method. If model relating to the hearing sense is caused to be more fine and ability of the encoding apparatus is enhanced, more efficient encoding from a viewpoint of the hearing sense can be made.

A conventional signal encoding apparatus will now be described by using FIG. 12 and figures succeeding thereto. In FIG. 12, acoustic signal waveform supplied through terminal 100 is transformed into signal frequency components by transform circuit 101. Then, respective components are encoded by signal component encoding circuit 102. Thus, code train is generated by code train generating circuit 103, and is outputted from terminal 104.

An actual configuration of transform circuit 101 of FIG. 12 is shown in FIG. 13. In FIG. 13, a signal delivered through terminal 200 (signal through terminal 100 of FIG. 12) is divided into signals in three frequency bands by two stages of band division filters 201, 202. At band division filter 201, the signal through terminal 200 is thinned so that it becomes equal to one half. At band division filter 202, one of the signals thinned into one half by the band division filter 201 is further thinned so that it becomes equal to one half (signal of terminal 200 is thinned so that it becomes equal to one fourth). Namely, bandwidths of two signals from band division filter 202 are one fourth of the bandwidth of the signal from terminal 200.

Signals of respective bands divided into three bands as described above by these band division filters 201, 202 are caused to be spectrum signal components by spectrum transform circuits 203, 204, 205 for carrying out spectrum transform processing such as MDCT, etc. Outputs of these spectrum transform circuits 203, 204, 205 are sent to the above-mentioned signal component encoding circuit 102 of FIG. 12.

An actual configuration of signal component encoding circuit 102 of FIG. 12 is shown in FIG. 14.

In FIG. 14, output from the signal component encoding circuit 102 delivered to terminal 300 is caused to undergo normalization every predetermined band by normalizing circuit 301, and is then sent to quantizing circuit 303. Moreover, signal delivered to the terminal 300 is sent also to quantization accuracy determining circuit 302.

At the quantizing circuit 303, quantization is implemented to signal from the normalizing circuit 301 on the basis of quantization accuracy calculated by quantization accuracy determining circuit 302 from signal through the terminal 300. Output from the quantizing circuit 303 is outputted from terminal 304, and is sent to code train generating circuit 103 of FIG. 12. In output signal from the terminal 304, normalization coefficient information in the normalizing circuit 301 and quantization accuracy information in the quantization accuracy determining circuit 302 are included in addition to signal components quantized by the quantizing circuit 303.

Outline of the configuration of a decoding apparatus adapted for decoding an acoustic signal from code trains generated by the encoding apparatus of the structure of FIG. 12 to output the decoded signal is shown in FIG. 15.

In FIG. 15, codes of respective signal components are extracted by code train decomposing circuit 401 from code train generated by the configuration of FIG. 12, which is supplied through terminal 400. Respective signal components are restored (reconstructed) by signal component decoding circuit 402 from those codes. Thereafter, inverse transform processing corresponding to transform processing of the transform circuit 101 of FIG. 12 is implemented by inverse transform circuit 403. Thus, acoustic waveform signal is obtained. This acoustic waveform signal is outputted from terminal 404.

An actual configuration of inverse transform circuit 403 of FIG. 15 is shown in FIG. 16.

The configuration of FIG. 16 corresponds to the example of configuration of the transform circuit shown in FIG. 13. Signals delivered from signal component decoding circuit 402 through terminals 501, 502, 503 are transformed by inverse spectrum transform circuits 504, 505, 506 for carrying out inverse spectrum transform processing corresponding to the spectrum transform processing in FIG. 13, respectively. Signals of respective bands obtained by these inverse spectrum transform circuits 504, 505, 506 are synthesized by two stages of band synthesis filters 507, 508.

Namely, outputs of inverse spectrum transform circuits 505 and 506 are sent to band synthesis filter 507, at which they are synthesized. Further, output of the band synthesis filter 507 and output of the inverse spectrum transform circuit 504 are synthesized by band synthesis filter 508. Output of this band synthesis filter 508 is outputted from terminal 509 (terminal 404 of FIG. 15).

FIG. 17 is a view for explaining an encoding method conventionally carried out in the encoding apparatus shown in FIG. 12. In the example of FIG. 17, a spectrum signal is a signal obtained by transform circuit of FIG. 13. FIG. 17 shows levels of absolute values of spectrum signals (signal components) by MDCT in terms of dB values.

In FIG. 17, input signal is transformed into 64 spectrum signals every predetermined time block. Those spectrum signals are combined into groups (hereinafter referred to as encoding units) every five predetermined bands indicated by b1 to b5 in FIG. 17, and are caused to undergo normalization and quantization. In this example, bandwidths of respective encoding units are caused to be narrow on the lower frequency band side and are broad on the higher frequency band side so that control of occurrence of quantizing noise in correspondence with the property of the hearing sense can be conducted.

However, in the above-described method conventionally used, bands where frequency components are quantized are fixed. For this reason, e.g., in the case where spectrum components concentrate on the portions in the vicinity of several specific frequencies, if attempt is made to quantize those spectrum components with sufficient accuracy, many bits must be allocated to a large number of spectrum components belonging to the same band as that of those spectrum components.

Namely, as is clear from the FIG. 17 mentioned above, when normalization is carried out in the state where signals are combined every predetermined bands, normalization coefficient values are normalized on the basis of great normalization coefficient value determined by tone characteristic component, e.g., in the frequency band of b3 in the figure where tone characteristic component is included in signal.

At this time, noise included in acoustic signal of tone characteristic where energies of spectrum components concentrate on a specific frequency or frequencies is generally very offensive to the ear as compared to noise applied to acoustic signal where energies are gently distributed over a broad frequency band and is therefore a great obstacle from a viewpoint of the hearing sense. Further, if spectrum components having great energy, i.e., tone characteristic components are not quantized with good accuracy, in the case where those spectrum components are caused to be waveform signals on the time base for a second time to synthesize it with blocks before and after, distortion between blocks becomes great and great connection distortion takes place when synthesized with waveform signals of adjacent time blocks, so there also results a great obstacle from a viewpoint of the hearing sense. For this reason, for encoding of tone characteristic components, quantization must be carried out by a sufficiently large number of bits. However, in the case where quantization accuracies are determined every predetermined frequency bands as described above, it is necessary to allocate many bits to a large number of spectrum components within encoding units including tone characteristic components to carry out quantization thereof, resulting in poor encoding efficiency. Accordingly, it was conventionally difficult to improve efficiency of encoding without deteriorating sound quality particularly with respect to acoustic signals of tone characteristic.

SUMMARY OF THE INVENTION

With the above in view, an object of this invention is to provide a signal encoding apparatus which can improve efficiency of encoding without deteriorating sound quality, particularly with respect to tone characteristic of an acoustic signal, a recording medium adapted so that signals processed by such signal encoding apparatus are recorded thereon or thereinto, and a signal decoding apparatus adapted for decoding encoded signal reproduced from such a recording medium, or transmitted from a signal encoding apparatus as mentioned above.

DISCLOSURE OF THE INVENTION

This invention has been made in view of such actual circumstances. A signal encoding apparatus according to this invention includes transforming means for transforming an input signal into frequency components, separating means for separating an output of the transforming means into a first signal of tone characteristic components and a second signal of other components, first encoding means for encoding the first signal, and second encoding means for encoding the second signal, wherein the first encoding means encodes respective signal components of the first signal so that they respectively have different code lengths.

Here, the signal encoding apparatus of this invention carries out processing as described below. Namely, the first encoding means is operative so that, in encoding of the first signal, it normalizes amplitude information of respective tone characteristic components of the first signal by normalization coefficient thereafter to encode those normalized amplitude information. Moreover, this signal encoding apparatus encodes respective frequency components of the respective tone characteristic components by a plurality of spectral quantinzation and coding rules (herein "transform rules"). Which one of the plurality of transform rules is used in implementation of encoding is determined by relative positional relationship on the frequency base between maximum frequency component and respective frequency components of the tone characteristic components. One transform rule, of the above-mentioned transform rules, applied to the maximum frequency component carries out a transform processing into shorter codes with respect to frequency components having greater amplitude value information. Another transform rule, of the above-mentioned transform rules, applied to other respective frequency components of maximum frequency component carries out a transform processing into shorter codes with respect to frequency components having smaller amplitude value information. In this case, the input signal is acoustic signal.

Moreover, the first encoding means of the signal encoding apparatus of this invention normalizes and quantizes amplitude information of respective tone characteristic components of the first signal by normalization coefficients to encode them, and omits amplitude information of the maximum frequency component in this encoding.

The signal encoding apparatus of this invention in this case carries out a processing as described below. Namely, the separating means allows the tone characteristic components to overlap with each other on the frequency base to carry out separation of the first signal. Values of the normalization coefficients are set so that according as those values become smaller, accuracy becomes higher. Also in this case, input signal is acoustic signal.

A recording medium of this invention is adapted so that a signal consisting of tone characteristic components encoded so as to respectively have different lengths and a second signal consisting of other components are recorded thereonto or thereinto.

The recording medium of this invention is featured below. Namely, amplitude information of respective tone characteristic components of the first signal are normalized by normalization coefficients and encoded. Moreover, respective frequency components of the tone characteristic components are encoded by a plurality of transform rules. Which of the plurality of transform rules is used in implementation of encoding is determined by relative positional relationship on the frequency base between maximum frequency component and respective frequency components of tone characteristic components. Transform rule applied to the maximum frequency component of the above-mentioned transform rules carries out a transform processing into shorter codes with respect to frequency components having greater amplitude value information. Transform rule applied to other respective frequency components of the maximum frequency component of the above-mentioned transform rule carries out a transform processing into shorter codes with respect to frequency components having smaller amplitude value information. In this case, signal to be recorded is acoustic signal.

Moreover, a recording medium of this invention is adapted so that a first signal consisting of tone characteristic components and a second signal consisting of other components are recorded in a manner separate from each other. In this case, signals obtained by normalizing and quantizing amplitude information of tone characteristic components of the first signal to encode them are recorded. In addition, information except for information obtained by normalizing and quantizing amplitude information of the maximum frequency are recorded as the first signals.

Here, recording is made in such a manner that tone characteristic components of the first signal overlap with each other on the frequency base. Normalization coefficients for the normalization are set so that accordingly as those values become smaller, the accuracy becomes higher.

A signal decoding apparatus of this invention comprises first decoding means for decoding a first signal consisting of tone characteristic components encoded so that they respectively have different lengths, second decoding means for decoding a second signal consisting of other components, and synthetic inverse transforming means for synthesizing respective signals to inversely transform them, or inversely transforming respective signals to synthesize them.

The signal decoding apparatus of this invention is featured as below. Namely, amplitude information of respective tone characteristic components of the first signal are normalized by normalization coefficients and are encoded. Moreover, respective frequency components of the tone characteristic components are encoded by a plurality of transform rules. Which of the plurality of transform rules is used in implementation of encoding is determined by relative positional relationship on the frequency base between maximum frequency component and respective frequency components of tone characteristic components. One transform rule, of the above-mentioned transform rules, applied to the maximum frequency component carries out a transform processing into shorter codes with respect to frequency components having greater amplitude value information. Another transform rule, of the above-mentioned transform rules, applied to components except for the maximum frequency component carries out a transform processing into shorter codes with respect to frequency components having smaller amplitude value information. In this case, output signal is acoustic signal.

Moreover, signal decoding apparatus of this invention comprises first decoding means for decoding a first signal consisting of tone characteristic components encoded in the state where information obtained by normalizing and quantizing amplitude information of maximum frequency component is excluded, second decoding means for decoding a second signal consisting of other components, and synthetic inverse transforming means for synthesizing respective signals to inversely transform them, or to inversely transform respective signals to synthesize them.

In this case, tone characteristic components of the first signal are encoded in the state overlapping with each other on the frequency base. In addition, normalization coefficients for the normalization are set so that accordingly, as those values become smaller, accuracy becomes higher.

In accordance with this invention, in the case of implementing encoding to an inputted signal in the state separated into signal components (tone characteristic components) where energies concentrate on a specific frequency and components (components except for the tone characteristic components) where energies are gently distributed in a broad frequency band, encoding of variable length is effectively applied to signals of tone characteristic components, thereby realizing more efficient encoding. In addition, with respect to spectrum coefficient where absolute value is maximum, e.g., only code information of positive and negative is encoded, thereby realizing more efficient encoding.

BRIEF DESCRIPTION OF THE DRAWINGS

FIG. 20A is a code table showing transform rule with respect to maximum spectrum coefficient.

FIG. 20B is a code table showing transform rule of peripheral spectrum coefficients in the case where the same transform rule is used with respect to all peripheral components.

BEST MODE FOR CARRYING OUT THE INVENTION

Preferred embodiments of this invention will now be described with reference to the attached drawings.

Figure 1:
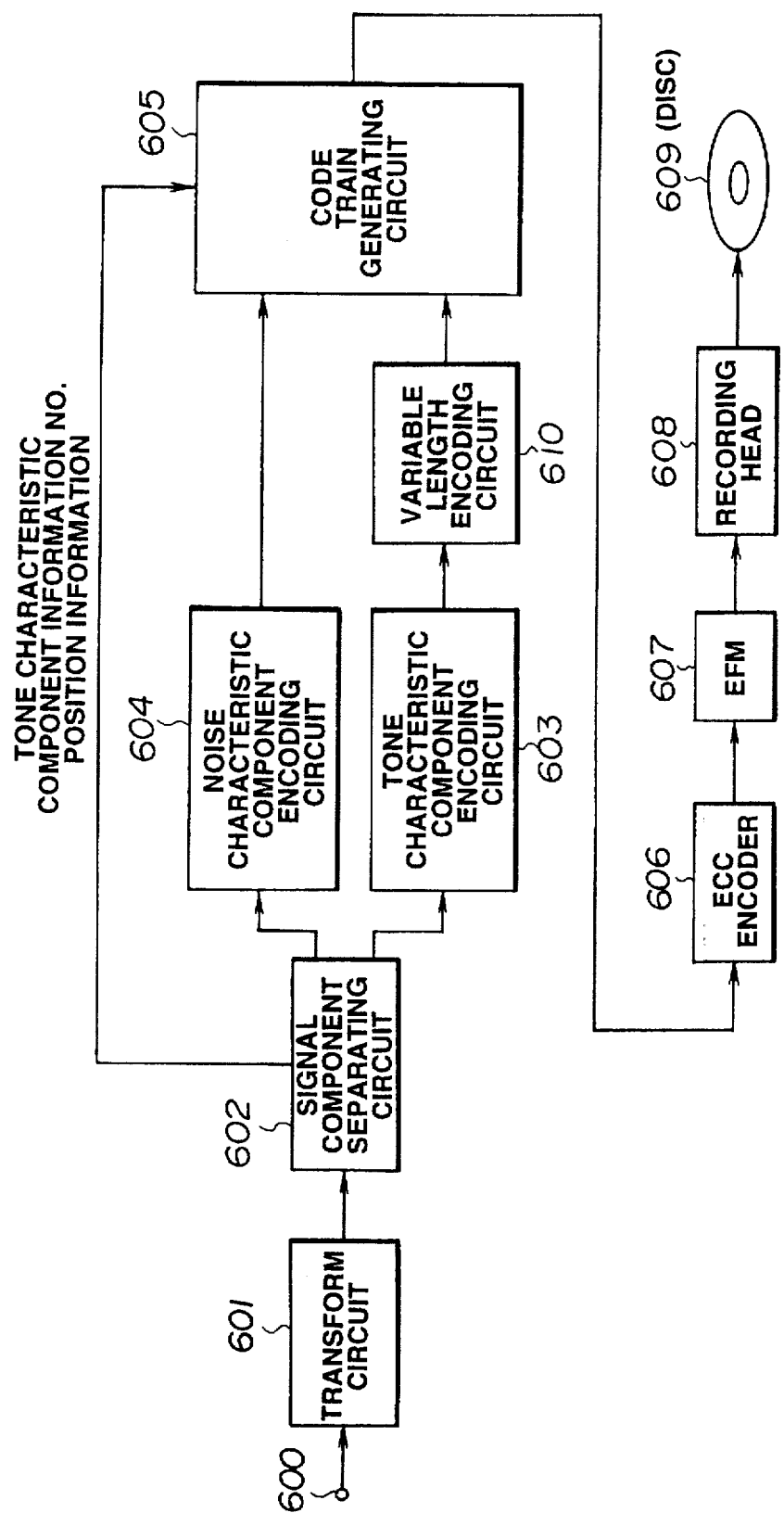
FIG. 1 is a circuit diagram showing, in a block form, outline of the configuration of an encoding apparatus of an embodiment according to this invention.

FIG. 1 shows an outline of the configuration of a signal encoding apparatus of an embodiment according to this invention.

In FIG. 1, terminal 600 is supplied with an acoustic waveform signal. This acoustic signal waveform is transformed into signal frequency components by transform circuit 601, and is then sent to signal component separating circuit 602.

At this signal component separating circuit 602, signal frequency components obtained by transform circuit 601 are separated into tone characteristic components having sharp spectrum distribution and signal frequency components except for the above, i.e., noise characteristic component having flat spectrum distribution. The tone characteristic components having sharp spectrum distribution of these separated frequency components are encoded by tone characteristic component encoding circuit 603, and the noise characteristic components which are signal frequency components except for the above are encoded by noise characteristic component encoding circuit 604. Signal outputted from tone characteristic component encoding circuit 603 is caused to undergo variable length encoding at variable length encoding circuit 610. Outputs from the variable length encoding circuit 610 and the noise characteristic component encoding circuit 604 are inputted to code train generating circuit 605, at which a code train is generated. The code train thus generated is outputted therefrom. ECC encoder 606 adds error correction code to the code train from code train generating circuit 605. Output from ECC encoder 606 is modulated by EFM circuit 607. The modulated signal thus obtained is delivered to recording head 608. This recording head 608 records the code train outputted from EFM circuit 607 onto disc 609.

Figure 13:
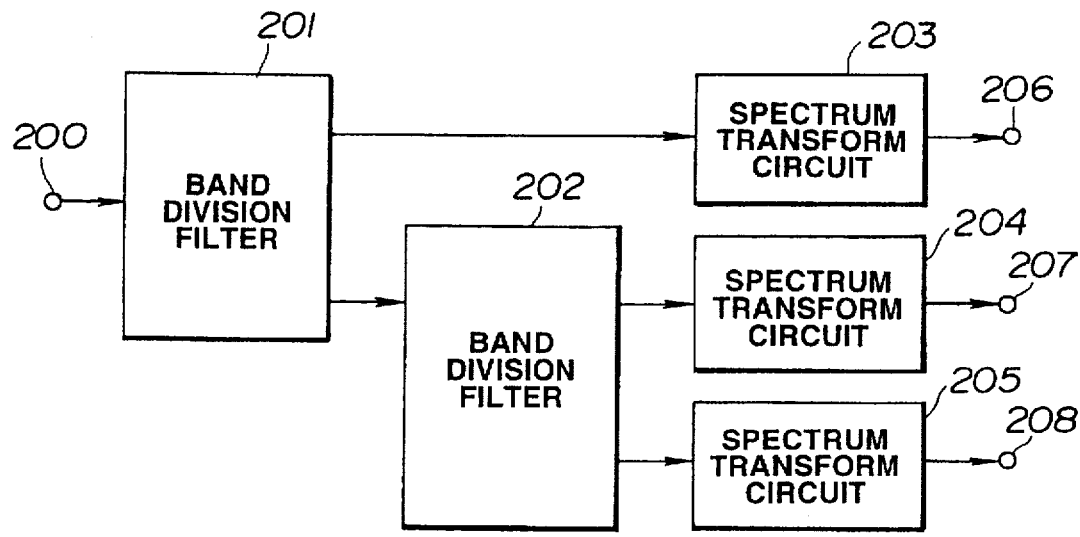
FIG. 13 is a circuit diagram showing, in a block form, actual configuration of transform circuits of this embodiment and conventional encoding apparatus.

It should be noted that a configuration similar to that of the FIG. 13 mentioned above may be employed as transform circuit 601. Of course, as actual configuration of transform circuit 601 of FIG. 1, a large number of configurations may be conceivable besides the configuration of the FIG. 13 mentioned above. For example, input signal may be directly transformed into spectrum signal by MDCT, and DFT or DCT, etc. may be used as spectrum transform processing in place of MDCT.

Moreover, while signal may be divided into signals in frequency components by band division filter as previously described, since the encoding in this invention is effectively exerted particularly in the case where energies concentrate on a specific frequency or frequencies, employment of a method of transformation into frequency components by the above-described spectrum transform processing by which a large number of frequency components are obtained by relatively small operation quantity is convenient.

Figure 14:
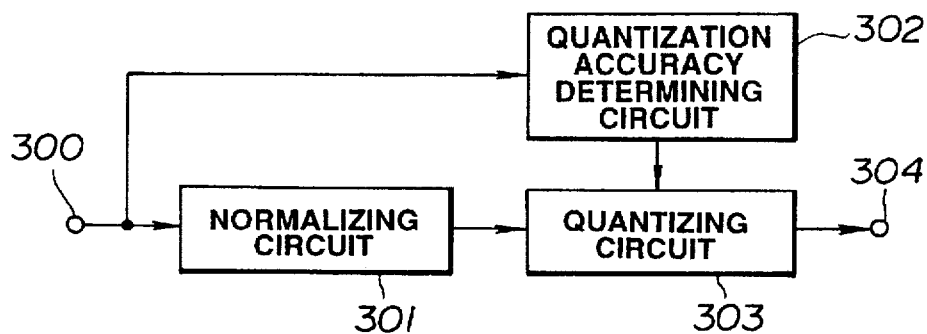
FIG. 14 is a circuit diagram showing, in a block form, actual configuration of a signal component encoding circuit of this invention and conventional encoding apparatus.
Figure 15:
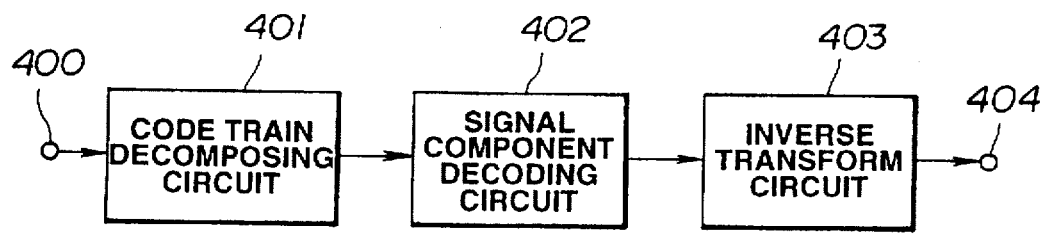
FIG. 15 is a circuit diagram showing, in a block form, outline of the configuration of conventional decoding apparatus.

Further, the tone characteristic component encoding circuit 603 and the noise characteristic component encoding circuit 604 may be fundamentally realized by a configuration similar to that of the FIG. 14 mentioned above.

Figure 2:
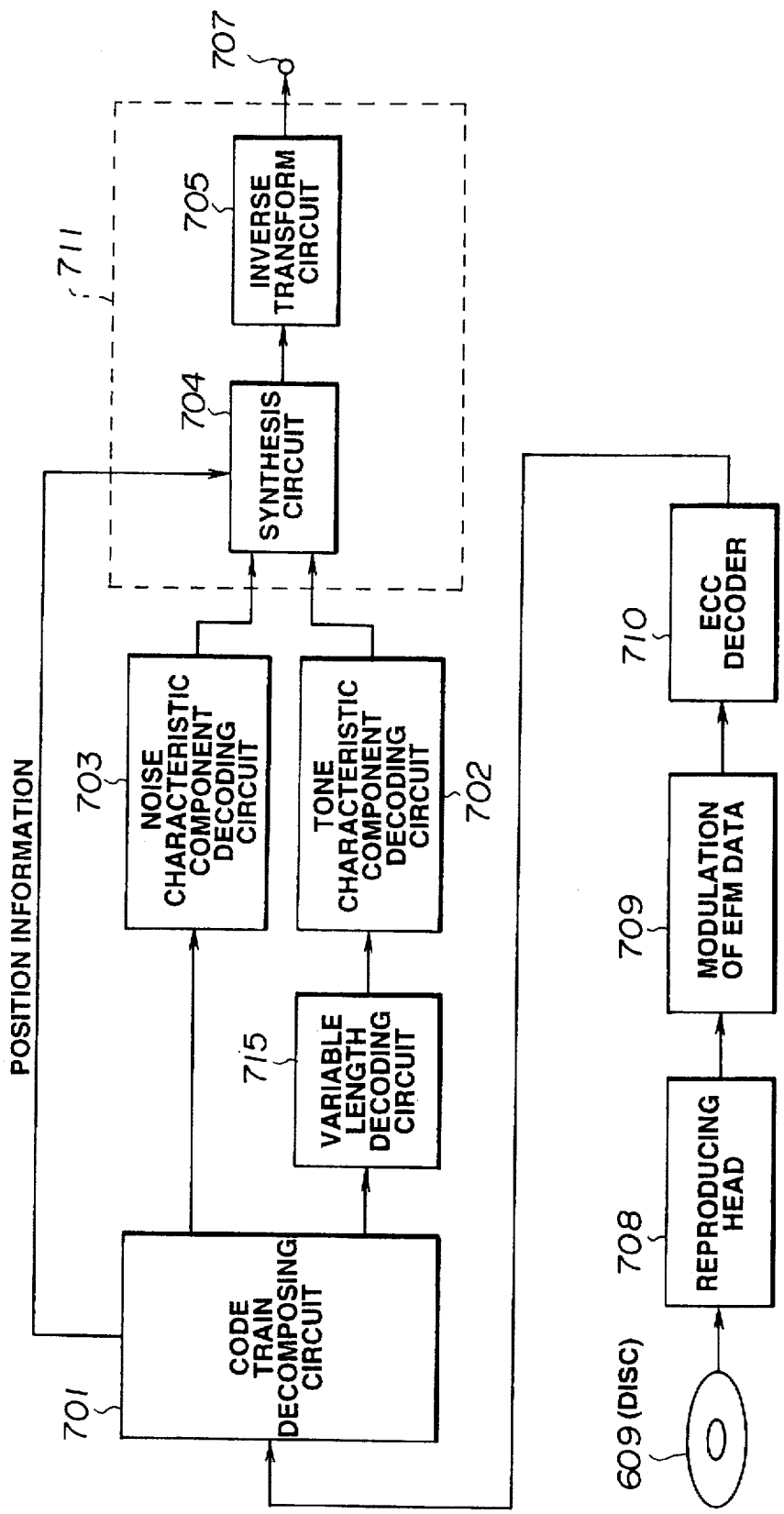
FIG. 2 is a circuit diagram showing, in a block form, outline of the configuration of a decoding apparatus of the embodiment according to this invention.

On the other hand, FIG. 2 shows an outline of the configuration of a signal decoding apparatus of the embodiment according to this invention for decoding a signal encoded by the encoding apparatus of FIG. 1.

Figure 18:
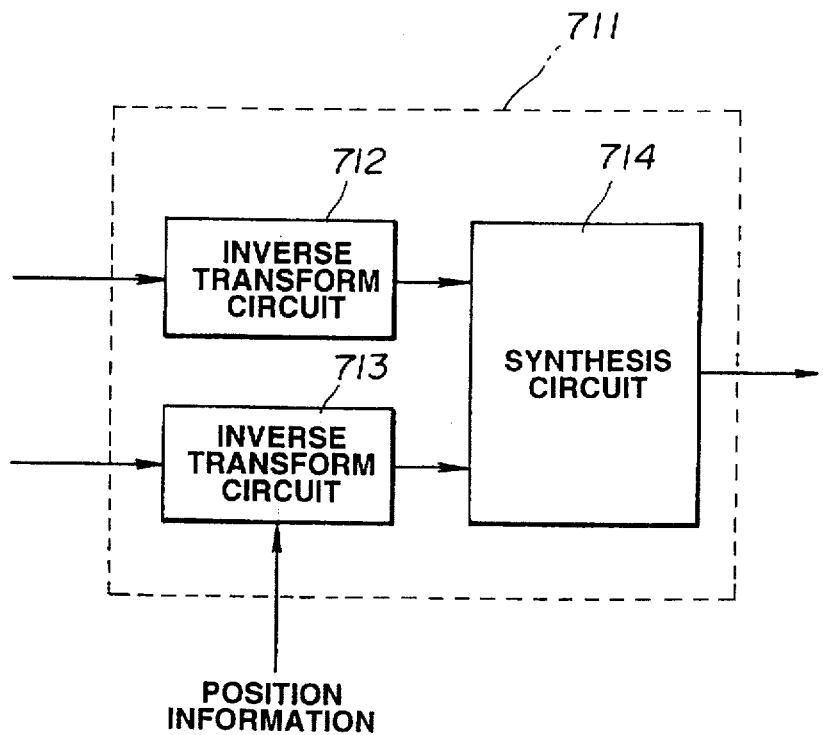
FIG. 18 is a circuit diagram showing, in a block form, another example of synthetic inverse transform section constituting decoding apparatus according to this invention.

In FIG. 2, code train reproduced through reproducing head 708 from disc 609 is delivered to EF demodulating circuit (labeled demodulation of EFM data) 709. This EF demodulating circuit 709 demodulates inputted code train The demodulated code train is delivered to ECC decoder 710, at which error correction is carried out. Code train decomposing circuit 701 recognizes, on the basis of tone characteristic component information No. of error-corrected code train, which portion of code train belongs to tone characteristic component code to separate the inputted code train into tone characteristic component codes and the noise characteristic component codes. Moreover, code train separating circuit 701 separates position information of tone characteristic component from the inputted code train to output it to synthesis circuit 704 of the succeeding stage. The tone characteristic component codes are caused to undergo variable length decoding by variable length decoding circuit 715, and are then sent to tone characteristic component decoding circuit 702, and the noise characteristic component codes are sent to noise characteristic component decoding circuit 703, at which inverse quantization and release of normalization are respectively carried out and respective components are decoded. Thereafter, decoded signals from tone characteristic component decoding circuit 702 and noise characteristic component decoding circuit 703 are delivered to synthesis circuit 704 for carrying out synthesis corresponding to separation at the signal component separating circuit 602 of FIG. 1. The synthesis circuit 704 adds the decoded signal of tone characteristic component to a predetermined position of decoded signal of noise characteristic component on the basis of position information of tone characteristic component delivered from code train separating circuit 701 to thereby carry out synthesis on the frequency base of noise characteristic component and tone characteristic component. Further, the decoded signal thus synthesized is caused to undergo inverse transform processing at inverse transform circuit 705 for carrying out inverse transform processing corresponding to transform processing at the transform circuit 601 of FIG. 1 so that signal on the frequency base is caused to be original waveform signal on the time base for a second time. Output waveform signal from the inverse transform circuit 705 is outputted from terminal 707. It should be noted that the processing order of inverse transformation and synthesis may be reversed from that above. In this case, synthetic inverse transform section 711 in FIG. 2 is constructed as shown in FIG. 18. Inverse transform circuit 712 constituting the synthetic inverse transform section 711 inverse-transforms decoded signal of noise characteristic component on the frequency base from noise characteristic component decoding circuit 703 into noise characteristic component signal on the time base. Inverse transform circuit 713 arranges the decoded signal of the tone characteristic component from the tone characteristic component decoding circuit 702 at position on the frequency base indicated by position information of tone characteristic component delivered from code train separating circuit 701 to inverse-transform it to generate a tone characteristic component signal on the time base. Synthesis circuit 714 synthesizes the noise characteristic component signal on the time base from inverse transform circuit 712 and the tone characteristic component signal on the time base from inverse transform circuit 713, thus to generate the original waveform signal.

Figure 16:
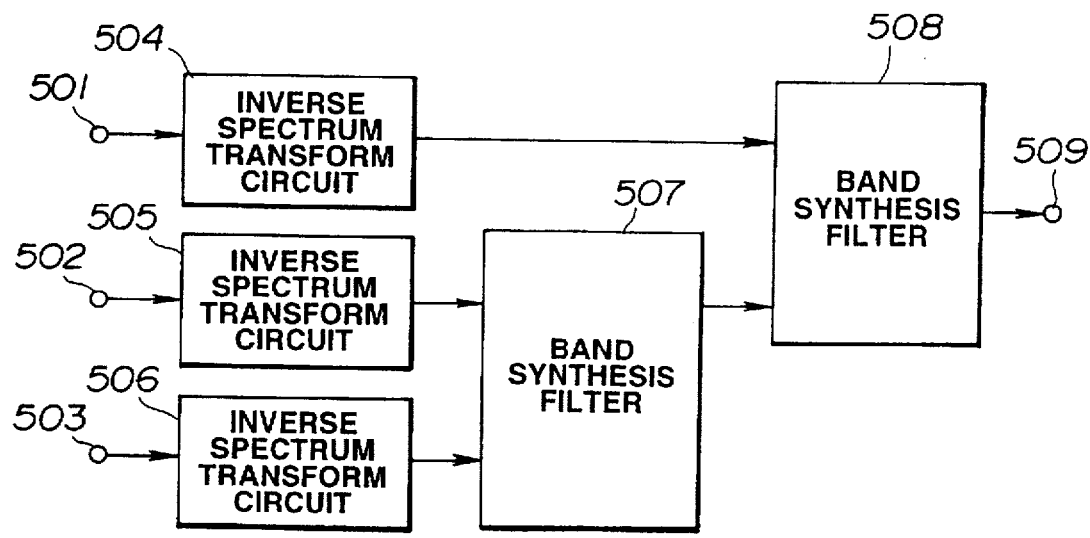
FIG. 16 is a circuit diagram showing, in a block form, actual configuration of inverse transform circuits applied to this invention and conventional decoding apparatus.
Figure 17:
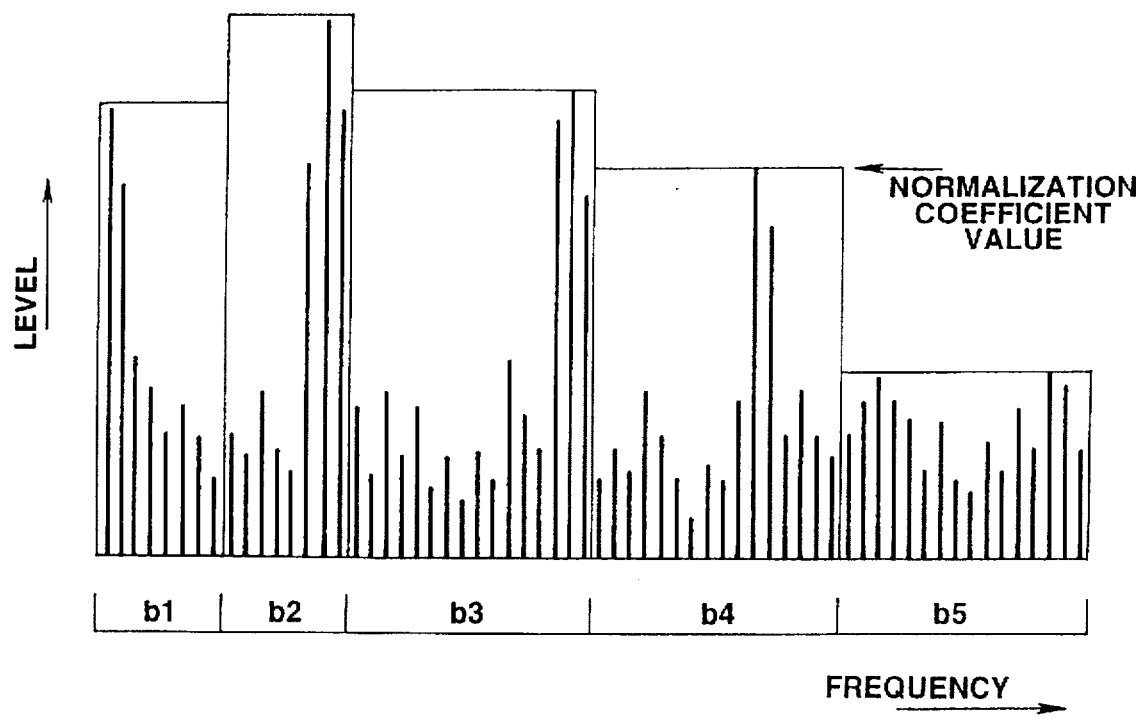
FIG. 17 is a view for explaining encoding method by the prior art.

It should be noted that configuration similar to the FIG. 16 mentioned above may be employed for the inverse transform circuits 705, 712, 713.

Figure 3:
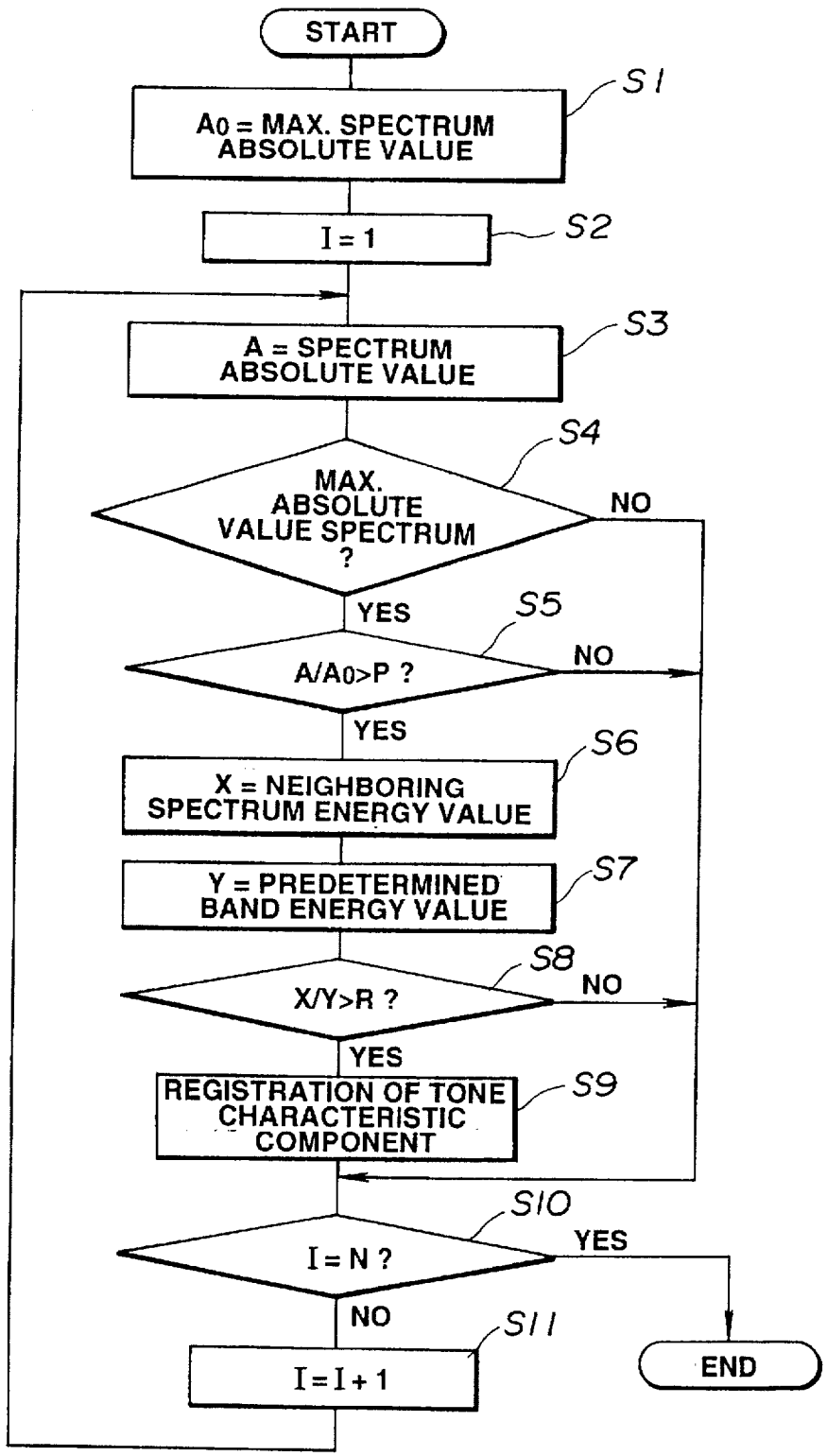
FIG. 3 is a flowchart showing flow of processing in signal component separating circuit according to this invention.

FIG. 3 shows the flow of actual processing for separating tone characteristic component in the signal component separating circuit 602 of encoding apparatus of FIG. 1.

In FIG. 3, I denotes No. of spectrum signals, N indicates total number of spectrum signals, and P, R indicate predetermined coefficients. Moreover, the above-mentioned tone characteristic component is determined on the basis of the following consideration. Namely, in the case where absolute value of a certain spectrum signal is greater than other spectrum components when locally viewed, difference between the absolute value and the maximum value of absolute values of spectrum signals in corresponding time block (block in spectrum transform processing) is a predetermined value or more, and sum of that spectrum and neighboring spectrum components (e.g., spectrum components adjoining thereto in both directions) is greater than or equal to a predetermined ratio, with respect to energy with a predetermined band including neighboring spectrum components, then that certain spectrum signal and the neighboring spectrum components (e.g., spectrum signals on both sides of the certain spectrum signal), are considered to be tone characteristic components. It should be noted that, as a predetermined band for comparison of ratio of energy distribution, there may be employed a band such that bandwidth is narrow in a lower frequency band and is broad in higher frequency band in correspondence with, e.g., critical bandwidths by taking the property of the hearing sense into consideration.

Namely, in FIG. 3, initially, at step S1, maximum spectrum absolute value is substituted for variable AO. At step S2, No. I of spectrum signal is set to 1. At step S3, a certain spectrum absolute value within a certain time block is substituted for variable A.

At step S4, whether or not the spectrum absolute value is the maximum absolute value spectrum greater than other spectrum components when locally viewed is judged. As a result, when it is not the maximum absolute value spectrum (No), the processing operation proceeds to step S10. In contrast, in the case where it is the maximum absolute value spectrum (Yes), the processing operation proceeds to step S5.

At step S5, ratio between variable A of the maximum absolute value spectrum in corresponding time block including the maximum absolute value spectrum and variable AO of the maximum spectrum absolute value and coefficient P indicating a predetermined magnitude are compared (A/A$_0$>P). As a result, in the case where A/A$_0$ is greater than P (Yes), the processing operation proceeds to step S6. In contrast, in the case where A/A$_0$ is less than P (No), the processing operation proceeds to step S10.

At step S6, energy value of neighboring spectrum (e.g., sum of energies of spectrum components adjoining to corresponding spectrum in both directions) of the spectrum absolute value (maximum absolute value spectrum) is substituted for variable X. At the subsequent step S7, energy value within a predetermined band including the maximum absolute value spectrum and the neighboring spectrums thereof is substituted for variable Y.

At the subsequent step S8, ratio between variable X of the energy value and variable Y of energy value within a predetermined band and coefficient indicating a predetermined ratio are compared (X/Y>R). As a result, when X/Y is greater than R (Yes), the processing operation proceeds to step S9. In contrast, when X/Y is less than R (No), the processing operation proceeds to step S10.

At step S9, in the case where the ratio between variable X of the energy value and variable Y of energy value within a predetermined band is greater than the predetermined ratio (R), the signal of the maximum absolute value spectrum component and the neighboring spectrum components thereof (e.g., signals of spectrum components on both sides of the signal of the maximum absolute value spectrum component) are considered to be tone characteristic components and are registered as such.

At the subsequent step S10, whether or not No. I of spectrum signal registered at the step S9 and total number N of spectrum signals are equal to each other (I=N) is judged. As a result, in the case where they are equal to each other (Yes), the processing is completed. In contrast, in the case where they are not equal to each other (No), the processing operation proceeds to step S11. At this step S11, I is set to I=I+1 to increase (increment) No. of spectrum signals by one. Thus, the processing operation returns to step S3 to repeat the above-mentioned processing. Signal component separating circuit 602 delivers frequency component or components judged to be tone characteristic component by the above-described processing to tone characteristic encoding circuit 603, and delivers other frequency components as noise characteristic component to noise characteristic component encoding circuit 604. Moreover, signal component separating circuit 602 delivers No. of frequency information judged to be tone characteristic component and information of that position to code train generating circuit 605.

Figure 4:
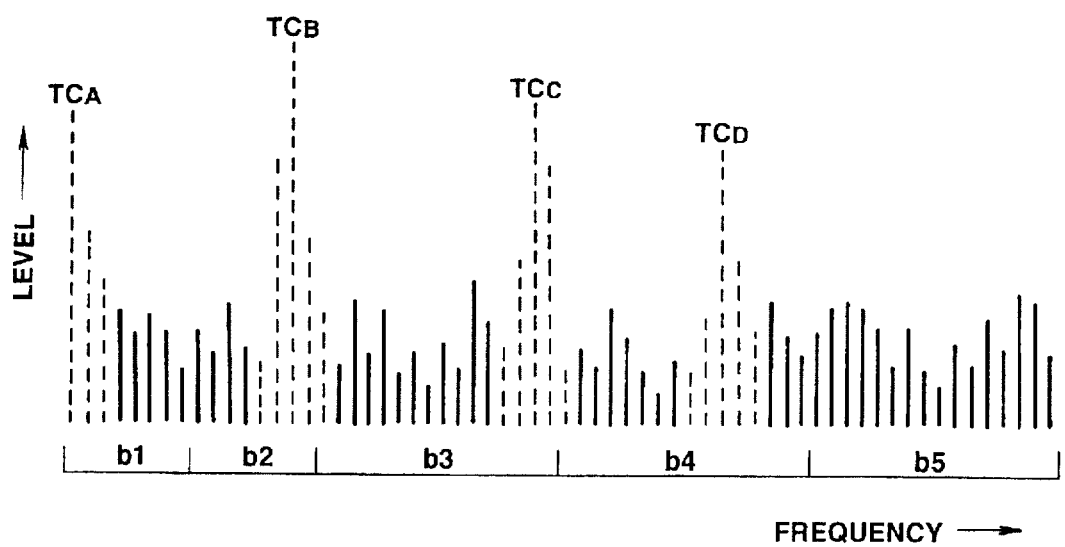
FIG. 4 is a view for explaining separation of tone characteristic component in signal encoding of this invention.

FIG. 4 shows the state of one example where tone characteristic components are separated from frequency components in a manner as described above.

In the example shown in FIG. 4, four tone characteristic components indicated by TC$_A$, TC$_B$, TC$_C$, TC$_D$ in the figure are extracted. Since these tone characteristic components are distributed in the state where they concentrate on small number of spectrum signals as in the example of FIG. 4, even if these components are quantized with good accuracy, a large number of bits are not so required as a whole. For this reason, while tone characteristic components are once normalized thereafter to quantize the normalized components to thereby improve efficiency of encoding, since spectrum signals constituting the tone characteristic component are relatively small in number, processing of normalization and/or re-quantization may be omitted thus to simplify the apparatus.

Figure 5:
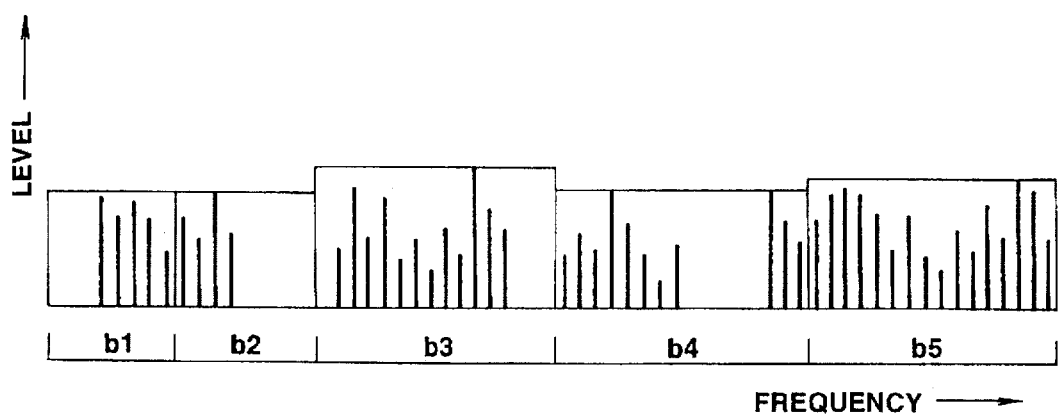
FIG. 5 is a view for explaining noise characteristic component in which tone characteristic components are removed from original spectrum signal in signal encoding of this invention.

Meanwhile, FIG. 5 shows the example where noise characteristic components in which tone characteristic components are excluded from original spectrum signal.

As shown in FIG. 5, tone characteristic components are excluded (caused to be zero), as described above, from the original spectrum signal in respective bands b1~b5. In this case, normalization coefficients in respective encoding units become small value. Accordingly, quantizing noises generated can be reduced even with a small number of bits.

While it has been described, that approach is employed to separate tone characteristic component to allow the tone characteristic components and signal components in the vicinity thereof to be zero thereafter to encode noise characteristic components, thereby making it possible to realize efficient encoding, there may be employed a method of encoding signal components obtained by subtracting signal obtained by encoding tone characteristic components to decode those components from original spectrum signal.

Figure 19:
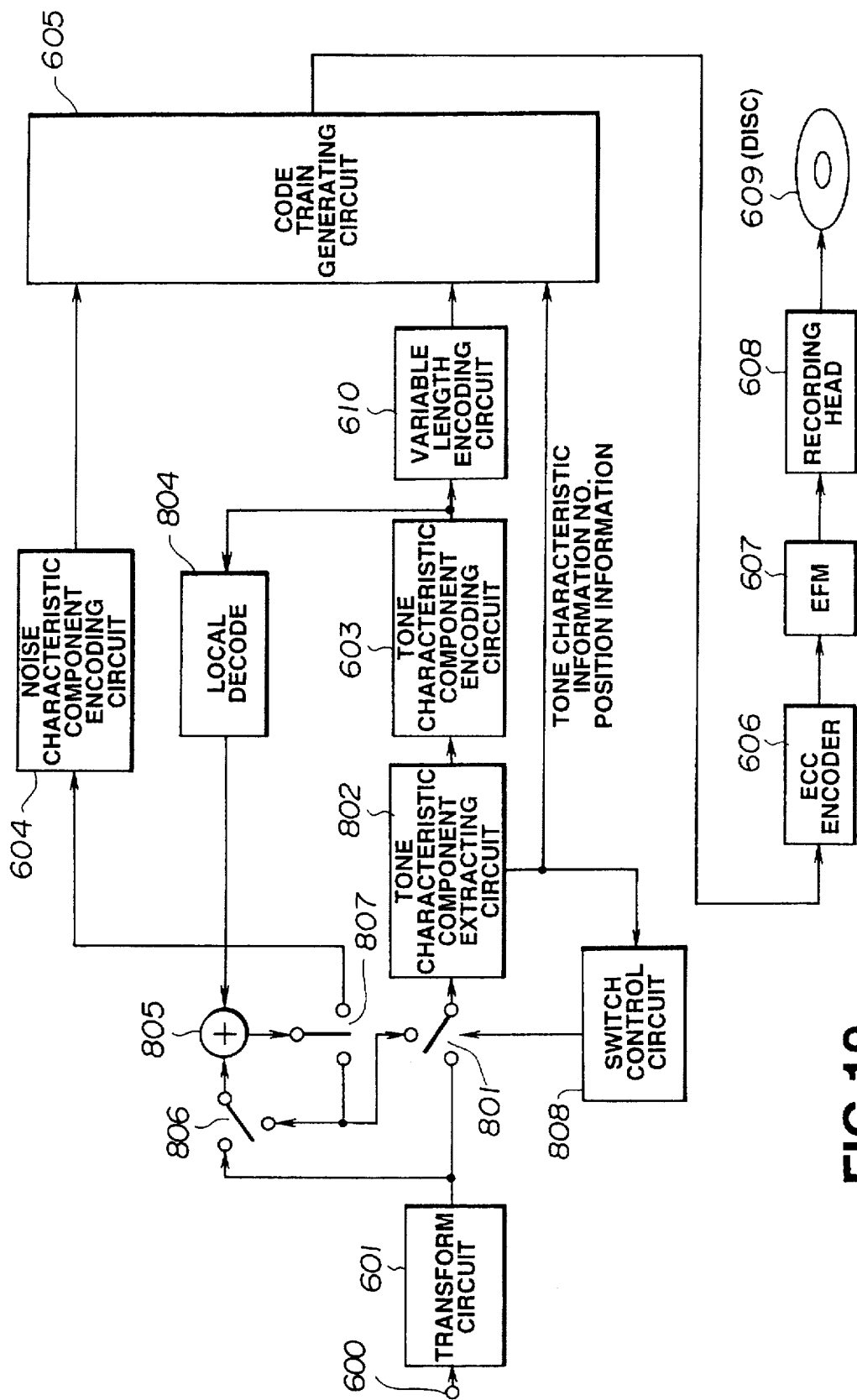
FIG. 19 is a circuit diagram showing, in a block form, another embodiment of an encoding apparatus according to this invention.

A signal encoding apparatus by this method will now be described with reference to FIG. 19. It is to be noted that the same reference numerals are respectively attached to the same components as those of FIG. 1 and their explanation is omitted.

Spectrum signal obtained by transform circuit 601 is delivered to tone characteristic component extracting circuit 802 through switch 801 controlled by control circuit 808. This tone characteristic component extracting circuit 802 discriminates tone characteristic component by the above-described processing of FIG. 3 to deliver only the discriminated tone characteristic component to tone characteristic component encoding circuit 603. Moreover, tone characteristic component extracting circuit 802 outputs the number of tone characteristic component information and its center position information to code train generating circuit 605. The tone characteristic component encoding circuit 603 implements normalization and quantization to the inputted tone characteristic component to deliver the normalized and quantized tone characteristic component to variable length encoding circuit 610 and local decoder 804. This variable length encoding circuit 610 implements variable length encoding to the normalized and quantized tone characteristic component to deliver the variable length code thus obtained to code train generating circuit 605. This local decoder 804 implements inverse quantization and releasing of normalization to the normalized and quantized tone characteristic component to decode signal of original tone characteristic component. It should be noted that quantizing noise would be included in decoded signal at this time. Output from local decoder 804 is delivered to adder 805 as the first decoded signal. Moreover, original spectrum signal from transform circuit 601 is delivered to adder 805 through switch 806 controlled by switch control circuit 808. This adder 805 subtracts the first decoded signal from the original spectrum signal to output the first difference signal. In the case where processing sequence of extraction, encoding, decoding, and difference determination of tone characteristic component is completed by only one processing sequence, the above-mentioned first difference signal is delivered as noise characteristic component to noise characteristic component encoding circuit 604 through switch 807 controlled by switch control circuit 808. Moreover, processing sequence of extraction, encoding, decoding, and difference determination of tone characteristic component is repeated, the first difference signal is delivered to tone characteristic component extracting circuit 802 through switch 801. Tone characteristic component extracting circuit 802, tone characteristic component encoding circuit 603, and local decoder 804, carry out processing similar to the above. Thus, the second decoded signal obtained is delivered to adder 805. Moreover, the first difference signal is delivered to adder 805 through switch 806. Adder 805 subtracts the second decoded signal from the first difference signal to output the second difference signal. Further, in the case where processing sequence of extraction, encoding, decoding, and difference determination of tone characteristic component is completed by two times of processing sequence, the second difference signal is delivered to noise characteristic component encoding circuit 604 through switch 807 as noise characteristic component. In the case where processing sequence of extraction, encoding, decoding, and difference determination of tone characteristic component is further repeated, processing similar to the above is carried out by tone characteristic component extracting circuit 802, tone characteristic component encoding circuit 603, local decoder 804 and adder 805. Switch control circuit 808 holds a threshold value of tone characteristic component information number, and controls switch 807 so that extraction, encoding, decoding, and difference determination processing sequence of tone characteristic component is completed in the case where the tone characteristic component information number obtained from the tone characteristic component extracting circuit is above the threshold value. In addition, in tone characteristic component encoding circuit 603, there can be employed a processing such that when tone characteristic component ceases to be extracted, extraction, encoding, decoding and difference determination processing sequence of tone characteristic component is completed.

Figure 6:
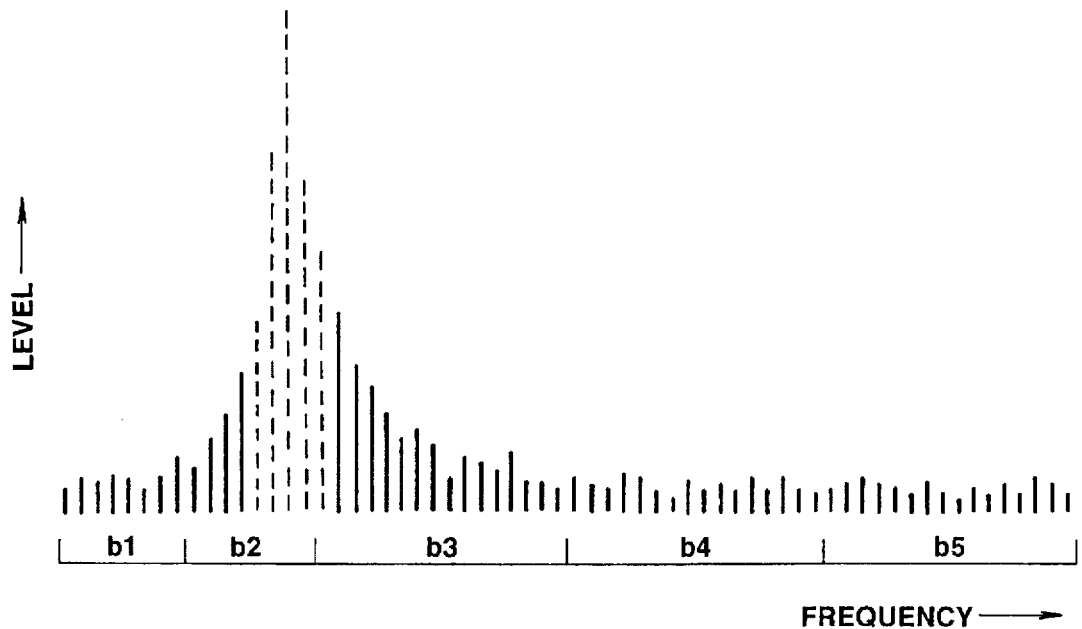
FIG. 6 is a view showing an example of spectrum signal.
Figure 7:
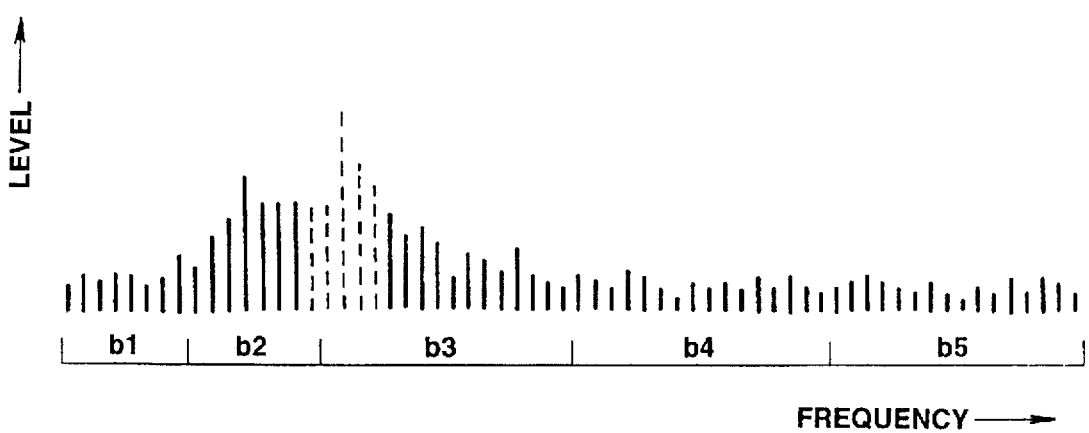
FIG. 7 is a view showing a signal in which signal obtained by encoding and decoding one tone characteristic component is subtracted from the spectrum signal of FIG. 6.

FIGS. 6 and 7 are views for explaining such a method, wherein FIG. 7 shows a signal in which a signal obtained by encoding one tone characteristic component to decode the encoded signal is subtracted from spectrum signal of FIG. 6.

Moreover, components indicated by broken lines in the figure are further extracted from the spectrum signal of FIG. 7 as tone characteristic component, thereby making it possible to improve encoding accuracy of the spectrum signal.

By repeating such an operation, high accuracy encoding can be carried out. In the case where this method is used, even if the upper limit of the number of bits for quantizing tone characteristic component is set to low value, encoding accuracy can be sufficiently high. Accordingly, there is also the benefit that the number of bits for recording quantization bit number can be reduced. Further, the method of extracting tone characteristic components in a multi-stage manner as stated above can be applied necessarily not only to the case where a signal equivalent to a signal obtained by encoding tone characteristic component to decode the encoded signal is subtracted from the original spectrum signal, but also to the case where a spectrum signal of the extracted tone characteristic component is caused to be zero. In the description of this invention, the expression that "signal from which tone characteristic components are separated", etc. should be considered to include both of the above-mentioned both cases.

While, in the encoding apparatus of this embodiment, as described above, original waveform signal is decomposed into tone characteristic components and noise characteristic components to carry out encoding, thereby making it possible to realize more efficient encoding, a method as described below is applied in connection with encoding of tone characteristic components, thereby making it possible to conduct still more efficient encoding.

Namely, with respect to respective tone characteristic components, energies concentrate on a spectrum coefficient where absolute value becomes maximum (which will be called maximum spectrum coefficient hereinafter) and peripheral spectrum coefficients (which will be called peripheral spectrum coefficients hereinafter). In this case, there is any deviation in distribution of values when respective coefficients are quantized, and state (manner) of distribution of the maximum spectrum coefficient and that of the peripheral spectrum coefficients are greatly different from each other in dependency upon relative positional relationship on the frequency base. Namely, if spectrum coefficients constituting respective tone components are normalized by normalization coefficient determined by maximum spectrum coefficient, i.e., respective spectrum coefficients constituting tone characteristic components are divided by maximum spectrum coefficient in those tone characteristic components, maximum spectrum coefficient after quantization becomes equal to a value closer to +1 or −1. On the contrary, since tone components have the characteristic that spectrum coefficients primarily abruptly decrease with maximum spectrum coefficient being as a center, peripheral spectrum coefficients after quantization are distributed at a higher frequency at values closer to zero.

In the case where there is any deviation in distribution of values to be encoded as stated above, so called variable length code to allocate shorter code length to pattern of high frequency as described in, e.g., D. A. Huffman: A Method for Construction of Minimum Redundancy Codes, Proc. I.R.E., 40, P. 1098 (1952) is employed, thereby making it possible to carry out efficient encoding.

In view of the above, in the signal encoding apparatus of the embodiment according to this invention, respective tone characteristic components are separated into maximum spectrum coefficient and peripheral spectrum coefficients to apply different variable length codes to respective spectrum coefficients, thereby realizing efficient encoding.

It should be noted that since tone characteristic components have very sharp spectrum distribution on the frequency base, distribution of values in the case where peripheral spectrum coefficients are normalized and quantized is greatly affected by relative positional relationship on the frequency base between those peripheral spectrum coefficients and maximum spectrum coefficient. In view of this, it is desirable to employ an approach to further classify (divide) peripheral spectrum coefficients into several sets (groups) depending upon relative position on the frequency base with respect to maximum spectrum coefficient to transform them by transform rules into different variable length codes every divided sets (groups).

As one method of classifying coefficients based upon relative position, there may be employed a method of carrying out classification by absolute values of differences on the frequency base with respect to maximum spectrum components.

Figure 8:
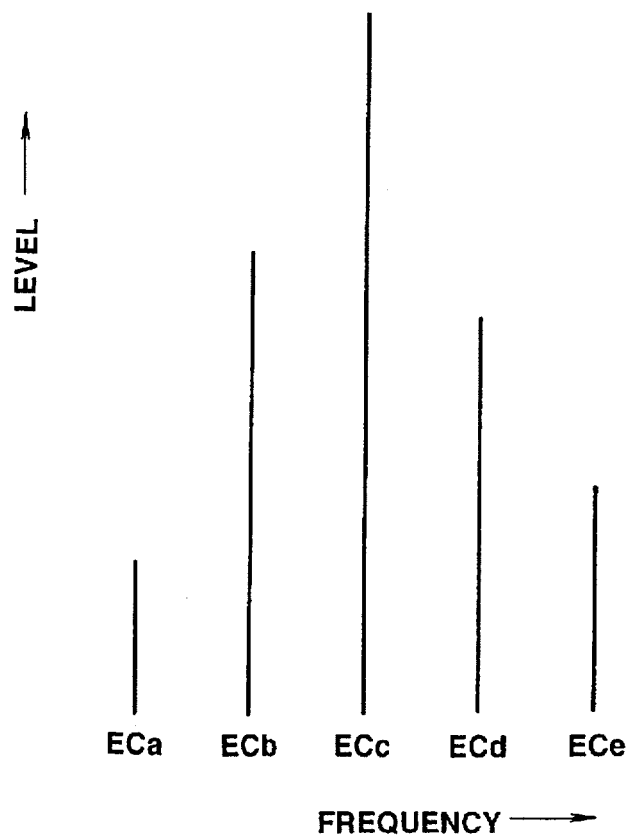
FIG. 8 is a view for explaining transform rule with respect to spectrum of tone characteristic components in this invention.

Namely, with respect to the spectrum of tone characteristic components as shown in FIG. 8, for example, three transform rules may be used. One transform rule with respect to maximum spectrum coefficient designated at ECc in the figure, another transform rule with respect to peripheral spectrum coefficients designated at ECb and ECd in the figure, and a third transform rule with respect to peripheral spectrum coefficients designated at ECa and ECe in the figure are used to carry out transform processing into variable length codes. Of course, variable length encoding may be carried out by the same transform rule with respect to all peripheral spectrum coefficients for the purpose of simplifying processing.

An example of a code table indicating the transform rule with respect to maximum spectrum coefficient is shown in FIG. 20A. Moreover, an example of a code table showing the transform rule of peripheral spectrum coefficients in the case where the same transform rule is used with respect to all peripheral spectrum coefficients is shown in FIG. 20B.

Maximum spectrum coefficient after normalization and quantization, i.e., quantized value of maximum spectrum is equal to a value closer to +1 or −1 as described above. Thus, as shown in FIG. 20A, if 00 and 01 which are codes having code lengths shorter than code lengths allocated to other values, it is possible to efficiently encode maximum spectrum coefficient.

Moreover, peripheral spectrum coefficients after normalization and quantization (i.e., quantized values of peripheral spectrum components), become equal to a value closer to zero as described above. Thus, as shown in FIG. 20B, if 0 which has code length shorter than code lengths allocated to other values is allocated to the above-mentioned 0 (zero), it is possible to efficiently encode peripheral spectrum coefficients.

Further, if plural code tables with respect to maximum spectrum coefficients and plural code tables with respect to peripheral spectrum coefficients are respectively provided every quantization accuracy determined at tone characteristic component encoding circuit 603 to select corresponding code table in correspondence with the determined quantization accuracy, more efficient encoding can be carried out.

Figure 9:
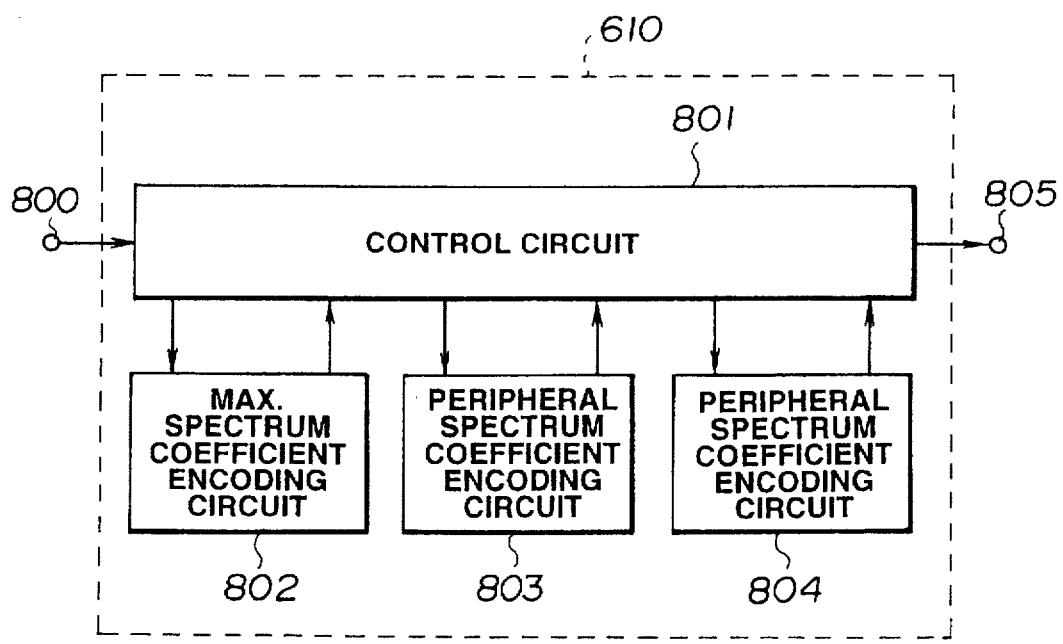
FIG. 9 is a circuit diagram showing, in a block form, actual configuration of a tone characteristic encoding circuit of FIG. 1.

FIG. 9 shows an actual example of variable length encoding circuit 610 of FIG. 1.

In FIG. 9, tone characteristic components inputted to terminal 800 are classified (divided) by control circuit 801 based upon relative position on the frequency base with respect to maximum spectrum component. The spectrum components thus classified are sent to maximum spectrum coefficient encoding circuit 802, peripheral spectrum coefficient encoding circuit 803 and peripheral spectrum coefficient encoding circuit 804 respectively corresponding thereto. At these respective circuits, those spectrum components are encoded on the basis of the above-described corresponding transform rules. Encoded outputs from respective encoding circuits 802, 803, 804 are outputted from output terminal 805 through control circuit 801.

Figure 10:
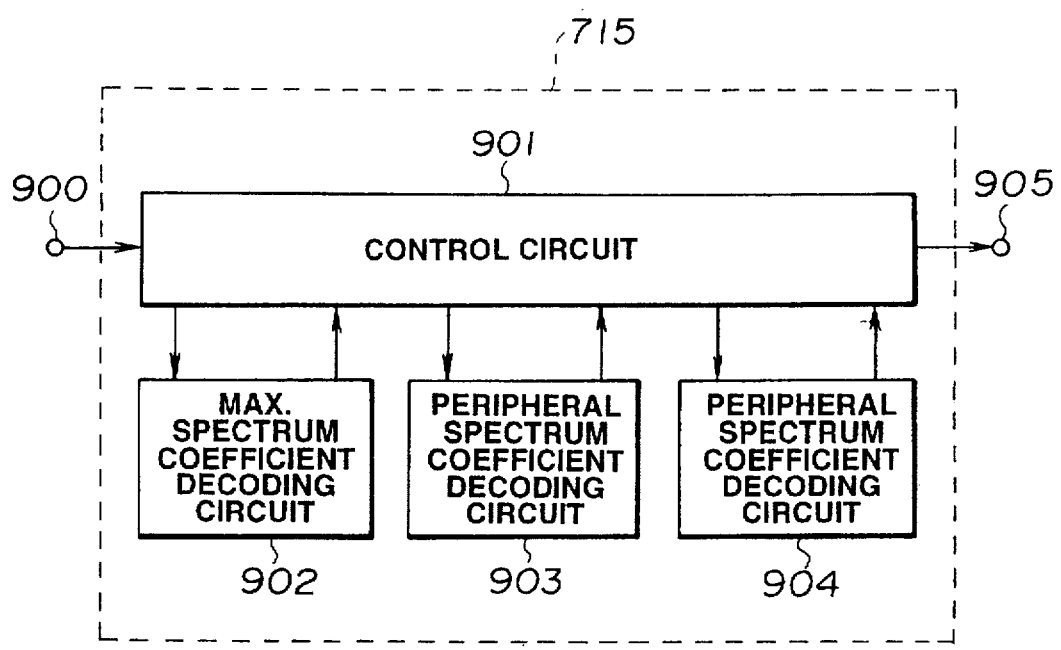
FIG. 10 is a circuit diagram showing, in a block form, actual configuration of tone characteristic decoding circuit of FIG. 2.

FIG. 10 shows an actual example of the above-described variable length decoding circuit 715 of FIG. 2.

In FIG. 10, tone characteristic component codes inputted to input terminal 900 are classified in correspondence with the classification of FIG. 9. The codes thus classified are sent to maximum spectrum coefficient decoding circuit 902, peripheral spectrum coefficient decoding circuit 903 and peripheral spectrum coefficient decoding circuit 904 respectively corresponding thereto. At these respective circuits, those codes are decoded on the basis of inverse transform rules respectively corresponding to the above-described transform rules. Decoded outputs from respective decoding circuits 902, 903, 904 are outputted from output terminal 905 through control circuit 901.

Figure 11:
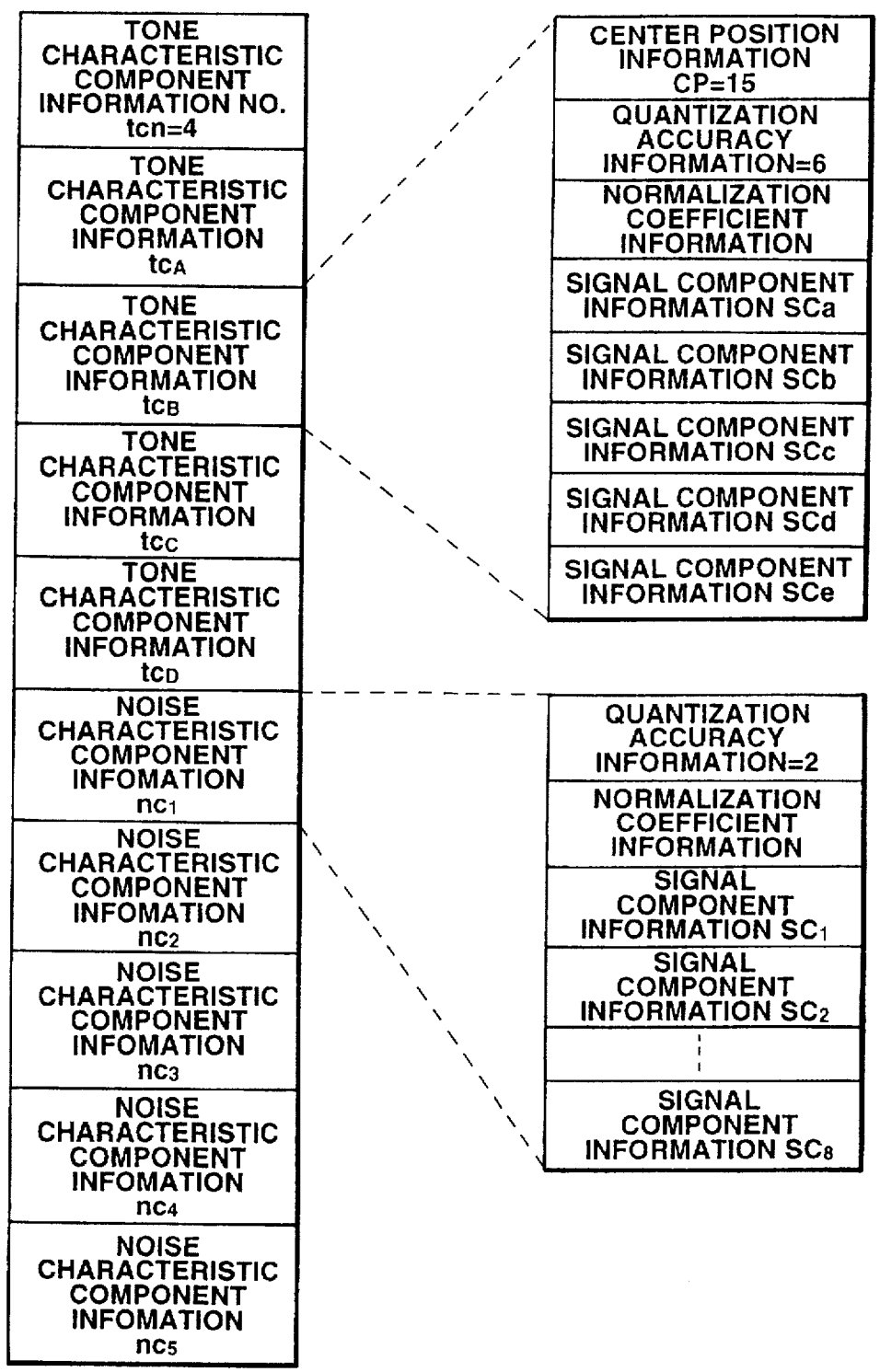
FIG. 11 is a view showing for explaining recording of code train obtained after undergone encoding by signal encoding system of this invention.
Figure 12:
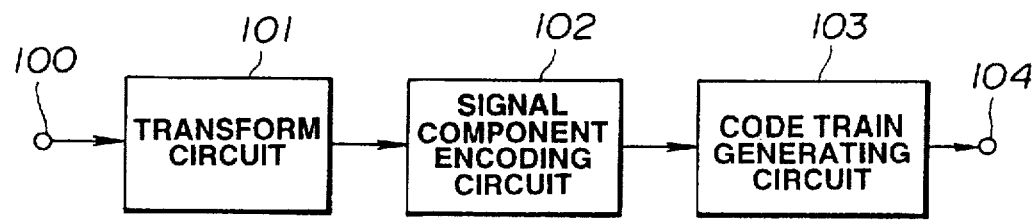
FIG. 12 is a circuit diagram showing, in a block form, outline of the configuration of a conventional encoding apparatus.

FIG. 11 shows the example in the case where spectrum signal of FIG. 4 is encoded by the encoding apparatus of this embodiment. Code trains thus obtained are recorded onto recording medium.

In this example, tone characteristic component information No. tcn' (e.g., 4 in the example of FIG. 11) is first recorded onto recording medium. Then, tone characteristic component information $tc_A$, $tc_B$, $tc_C$, $tc_D$ and noise characteristic components information $nc_1$, $nc_2$, $nc_3$, $nc_4$, $nc_5$ are recorded in order recited. In tone characteristic component information $tc_A$, $tc_B$, $tc_C$, $tc_D$, center position information CP indicating position of center spectrum of tone characteristic component (e.g., 15 in the case of, e.g., tone characteristic component $tc_B$), quantization accuracy information indicating the number of bits for quantization (e.g., 6 in the case of, e.g., tone characteristic component $tc_B$) and normalization coefficient information are recorded along with respective signal component information $SC_a$, $SC_b$, $SC_c$, $SC_d$, $SC_e$ which were caused to undergo normalization and quantization, and are then caused to undergo variable length encoding. In this example, transform rules of variable length encoding are determined in advance every quantization accuracy. The decoding apparatus carries out decoding of variable length codes by making reference to quantization accuracy information.

Here, e.g., in such cases that quantization accuracy is fixedly determined by frequency, it is of course unnecessary to record quantization accuracy information. It is to be noted that while position of center spectrum component of respective tone characteristic components is used as position information of tone characteristic components in the above-described embodiment, position of spectrum component of the lowest frequency band of respective tone characteristic components (e.g., 14 in the case of tone characteristic component $TC_B$) may be recorded.

Moreover, with respect to noise characteristic component information, quantization accuracy information (e.g. 2 in the case of noise characteristic component $nc_1$) and normalization coefficient information are recorded along with normalized and quantized respective signal component information $SC_1$, $SC_2$, ..., $SC_8$.

Here, in the case where quantization accuracy information is zero, encoding is not actually carried out in that encoding unit. In the case where quantization accuracy is fixedly determined every band similarly to the above, it is unnecessary to record quantization accuracy information.

FIG. 11 shows the embodiment of kind and order of information recorded on a recording medium. For example, information up to signal component information $SC_a$, $SC_b$, $SC_c$, $SC_d$, $SC_e$ are codes of variable length, and their lengths are not fixed.

The signal encoding apparatus of this embodiment has an ability to provide, with respect to maximum spectrum component of respective tone characteristic components, its amplitude information only by normalization coefficient information to permit implementation of more efficient encoding. Namely, tone characteristic encoding circuit 603 carries out normalization and quantization with respect to frequency components except for maximum spectrum component of respective tone characteristic components. It should be noted that there may be employed a configuration in which normalization and quantization are carried out with respect to all respective tone characteristic components including maximum spectrum as well at tone characteristic component encoding circuit 603, and quantized value corresponding to maximum spectrum is not outputted at code train generating circuit 605 of the succeeding stage. In the case where such an encoding is carried out, signal component information $SC_C$ includes only codes indicating positive and negative in the example of FIG. 11.

Here, since value approximate to amplitude information of maximum spectrum is primarily selected as normalization coefficient, in the case where normalization coefficients are recorded on recording medium, it is possible to obtain approximate values of amplitude information of maximum spectrum from those normalization coefficients. Accordingly, for example, in the case where spectrum information is realized by MDCT or DCT, etc., approximate value of maximum spectrum can be obtained from codes indicating positive and negative and normalization coefficient information. Moreover, for example, in the case where spectrum information is realized by DFT, etc., approximate value of maximum spectrum can be obtained only from phase component. Thus, recording of information obtained by quantizing amplitude information with respect to maximum spectrum can be omitted. This method is particularly effective in the case where normalization can be ensured with high accuracy.

In the case where accuracy of normalization coefficient is not sufficient in the signal encoding apparatus in this case, it may take place that accuracy of maximum spectrum coefficient cannot be sufficiently ensured. However, the method in which the configuration shown in FIG. 19 is used to extract tone characteristic components in a multi-stage manner is employed, thereby making it possible to solve the above-mentioned problem. As shown in FIGS. 6 and 7, in accordance with this method, there is high possibility that frequency components overlapping with each other on the frequency base are extracted plural times as tone characteristic components. In this case, it is desirable to make such a non-linear setting to carry out setting every fixed interval, e.g., by logarithmic scale in order that according as values of normalization coefficients become smaller, higher accuracy is provided.

Thus, if such a plurality of frequency components are synthesized on the decoding apparatus side, even in the case where accuracy of one normalization coefficient is not sufficient, it is possible to ensure an accuracy of a certain degree. Moreover, while the example where acoustic signal is encoded by the signal encoding apparatus of the embodiment according to this invention has been mainly described, encoding in this invention can be applied to encoding of general waveform signal. It should be noted that encoding in this invention is particularly effective in carrying out efficient encoding with respect to acoustic signal in which tone characteristic components have significant meaning from a viewpoint of the hearing sense.

Further, disc 609 of the above-described embodiment may be, e.g., magneto-optical recording medium, optical recording medium, or phase change type optical recording medium, etc. Furthermore, semiconductor memory or IC card, etc. may be used in addition to tape-shaped recording medium as recording medium which is substitutive for disc 609.

In addition, while the case where only tone characteristic components are caused to undergo variable length encoding has been described in the above-described embodiment, noise characteristic components may be also caused to undergo variable length encoding.

Industrial Applicability

As is clear from the foregoing description, in the signal encoding apparatus according to this invention, in transforming input signal into frequency components to separate the transformed output into a first signal consisting of tone characteristic components and a second signal consisting of other components to encode these first and second signals, respective signal components of the first signal are encoded so that they have different code lengths, thereby making it possible to extremely efficiently encode tone characteristic components of signal decomposed into tone characteristic components and noise characteristic components. Thus, encoding efficiency with respect to the entirety of signal waveform can be improved. Accordingly, if such compressed signals are recorded onto or into recording medium, recording capacity can be effectively utilized. In addition, when signals obtained by reproducing such recording medium are decoded, satisfactory signals, e.g., acoustic signals can be obtained.

What is claimed is:

1. A signal encoding apparatus adapted for encoding an input signal, comprising:

transforming means for transforming an input signal into a block of frequency components, each frequency component characterized by an energy distribution;

separating means for separating an output of the transforming means into a first signal consisting of tone characteristic components each tone characteristic component having a sharp energy distribution relative to energy distributions of frequency components in a local neighborhood of the tone characteristic component and to energy distribution of frequency components in the block and a second signal consisting of components other than the tone characteristic components;

first encoding means for encoding the first signal; and second encoding means for encoding the second signal, the first encoding means including variable length encoding means for implementing variable length encoding to respective signal components of only the first signal.

2. A signal encoding apparatus as set forth in claim 1, wherein the first encoding means is operative so that, in implementation of encoding of the first signal, it normalizes amplitude information of respective tone characteristic components of the first signal by normalization coefficients thereafter to implement variable length encoding thereto.

3. A signal encoding apparatus as set forth in claim 1 or 2, wherein the variable length encoding means implements variable length encoding to respective frequency components of the respective tone characteristic components by a plurality of transform rules.

4. A signal encoding apparatus as set forth in claim 3, wherein which any one of the plurality of transform rules is used in implementation of encoding is determined by relative positional relationship on the frequency base between a maximum frequency component and respective frequency components of the tone characteristic components.

5. A signal encoding apparatus as set forth in claim 3, wherein one of the plurality of transform rules applied to a maximum frequency component is adapted to carry out a transform processing of frequency components having greater amplitude values, into shorter codes.

6. A signal encoding apparatus as set forth in claim 3, wherein one of the plurality of transform rules applied to peripheral frequency components of a maximum frequency component is adapted to carry out a transform processing of frequency components having smaller amplitude values into shorter codes.

7. A signal encoding apparatus as set forth in claim 1, wherein the input signal is acoustic signal.

8. A signal encoding apparatus adapted for encoding an input signal, comprising:

transforming means for transforming an input signal into a block of frequency components;

separating means for separating an output of the transforming means into a first signal consisting of tone characteristic components, each tone characteristic component having a sharp energy distribution relative to energy distributions of frequency components in a local neighborhood of the tone characteristic component and to energy distribution of frequency components in the block, and a second signal consisting of components other than the tone characteristic components;

first encoding means for normalizing amplitude information of respective tone characteristic components of only the first signal by using normalization coefficients, and quantizing the normalized amplitude information to generate an encoded signal; and second encoding means for encoding the second signal, the first encoding means being operative to output, as the encoded signal, an encoded signal relating to frequency components except for a maximum frequency component of the respective tone characteristic components.

9. A signal encoding apparatus as set forth in claim 8, wherein the separating means extracts, plural times, frequency components overlapping with each other on the frequency base to allow the extracted frequency components to be the first signal.

10. A signal encoding apparatus as set forth in claim 8, wherein values of the normalization coefficients are set so that according as those values become smaller, accuracy becomes higher.

11. A signal encoding apparatus as set forth in claim 8, wherein the input signal is acoustic signal.

12. A signal decoding apparatus adapted for decoding an encoded signal, comprising:

first decoding means for decoding a first signal consisting of tone characteristic components caused to undergo variable length encoding, each tone characteristic component having a sharp energy distribution relative to energy distributions of frequency components in a local neighborhood of the tone characteristic component and to energy distribution of frequency components in a block;

second decoding means for decoding a second signal consisting of components other than tone characteristic components; and synthetic inverse transforming means for synthesizing respective signals to inversely transform them, or inversely transforming respective signals to synthesize them.

13. A signal decoding apparatus as set forth in claim 12, wherein amplitude information of respective tone characteristic components of the first signal are normalized by normalization coefficients and are encoded.

14. A signal decoding apparatus as set forth in claim 12 or 13, wherein the first decoding means decodes the first signal by a plurality of transform rules.

15. A signal decoding apparatus as set forth in claim 14, wherein which any one of the plurality of transform rules in implementation of decoding is determined by relative positional relationship on the frequency base between a maximum frequency component and respective frequency components of tone characteristic components.

16. A signal decoding apparatus as set forth in claim 14, wherein one of the plurality of transform rules applied to a maximum frequency component is adapted to carry out a transform processing of frequency components having smaller amplitude values, into shorter codes.

17. A signal decoding apparatus as set forth in claim 14, wherein one of the plurality of transform rules applied to components except for a maximum frequency component is adapted to carry out a transform processing of frequency components having smaller amplitude values, into short codes.

18. A signal decoding apparatus as set forth in claim 12, wherein the synthetic inverse transforming means outputs an acoustic signal.

19. A signal decoding apparatus adapted for decoding an encoded signal, comprising:

first decoding means for decoding a normalized and encoded first signal consisting of tone characteristic components, each tone characteristic component having a sharp energy distribution relative to energy distributions of frequency components in a local neighborhood of the tone characteristic component and to energy distributions of frequency components in a block;

second decoding means for decoding a second signal consisting of components other than the tone characteristic components; and synthetic inverse transforming means for synthesizing respective signals to inversely transform them, or inversely transforming respective signals to synthesize them, the first decoding means being operative to reproduce a maximum frequency component of the tone characteristic component on the basis of transmitted normalization coefficient.

20. A signal decoding apparatus as set forth in claim 19, wherein tone characteristic components of the first signal are encoded in the state overlapping with each other on the frequency base.

21. A signal decoding apparatus as set forth in claim 19, wherein the normalization coefficients are set so that according as those values become smaller, accuracy become higher.

22. A signal decoding apparatus as set forth in claim 19, wherein the synthetic inverse transform means outputs an acoustic signal.

23. A signal encoding method for encoding an input signal, comprising the steps of:

transforming an input signal into a block of frequency components, each frequency component characterized by an energy distribution;

separating the frequency components into a signal consisting of tone characteristic components, each tone characteristic component having a sharp energy distribution relative to energy distributions of frequency components in a local neighborhood of the tone characteristic component and to energy distribution of frequency components in the block, and a second signal consisting of components other than the tone characteristic components;

implementing variable length encoding to only the first signal; and encoding the second signal.

24. A signal encoding method as set forth in claim 23, wherein amplitude information of the first signal are normalized by normalization coefficients, and are then caused to undergo the variable length encoding.

25. A signal encoding method as set forth in claim 23 or 24, wherein the first signal is caused to undergo variable length encoding on the basis of a plurality of different transform rules.

26. A signal encoding method as set forth in claim 25, wherein any one of the plurality of different transform rules is selected on the basis of relative positional relationship on the frequency base between a maximum frequency component of signal components of the first signal and other frequency components.

27. A signal encoding method as set forth in claim 25, wherein one of the plurality of transform rules applied to a maximum frequency component is adapted to carry out a transform processing of frequency components having greater a amplitude values into shorter codes.

28. A signal encoding method as set forth in claim 25, wherein one of the plurality of transform rules applied to respective frequency components except for a maximum frequency component is adapted to allocate shorter codes with respect to smaller amplitude values.

29. A signal encoding method for encoding an input signal, comprising the steps of:

transforming an input signal into a block of frequency components each frequency component characterized by an energy distribution;

separating the frequency components of the transformed input signal into a first signal consisting of tone characteristic components, each tone characteristic component having a sharp energy distribution relative to energy distributions of frequency components in a local neighborhood of the tone characteristic component and to energy distribution of frequency components in the block, and a second signal consisting of components other than the tone characteristic components;

normalizing amplitude information of respective tone characteristic components of the first signal by using normalization coefficients, and quantizing the normalized amplitude information to encode them; and encoding the second signal;

the step of encoding the first signal includes a step of outputting, as the encoded signal, an encoded signal relating to frequency components except for a maximum frequency component of the respective tone characteristic components.

30. A signal encoding method as set forth in claim 29, wherein the step of separation includes a step of extracting, plural times, frequency components overlapping with each other on the frequency base.

31. A signal encoding method as set forth in claim 29, wherein the normalization coefficients are set so that according as those values become smaller, accuracy becomes higher.

32. A signal decoding method for decoding an encoded signal, comprising the steps of:

decoding a normalized and encoded first signal consisting of tone characteristic components, each tone characteristic component having a sharp energy distribution relative to energy distributions of frequency components in a local neighborhood of the tone characteristic component and to energy distribution of frequency components in a block; and decoding a second signal consisting of components other than the tone characteristic components;

synthesizing respective signals to inversely transform them, or inversely transforming respective signals to synthesize them, thus to reproduce an original signal, the step of decoding the first signal including a step of reproducing a maximum frequency component of the tone characteristic components on the basis of transmitted normalization coefficients.

33. A signal decoding method as set forth in claim 32, wherein the first signal includes a plurality of tone characteristic components overlapping with each other on the frequency base.

34. A signal decoding method as set forth in claim 32, wherein the normalization coefficients are set so that according as those values become smaller, accuracy becomes higher.

35. A signal encoding apparatus adapted for encoding an input signal, comprising:

transforming means for transforming an input signal into a block of frequency components, each frequency component characterized by an energy distribution;

separating means for separating an output of the transforming means into a first signal consisting of tone characteristic components, each tone characteristic component having a sharp energy distribution relative to energy distributions of frequency components in a local neighborhood of the tone characteristic component and to energy distribution of frequency components in the block, and a second signal consisting of components other than the tone characteristic components;

first encoding means for encoding only the first signal and alternatively only the second signal, the first encoding means including variable length encoding means for implementing variable length encoding to respective signal components of the first signal and alternatively the second signal; and second encoding means for encoding the second signal when the first encoding means encodes the first signal and alternatively encoding the first signal when the first encoding means encodes the second signal.

* * * * *

UNITED STATES PATENT AND TRADEMARK OFFICE
CERTIFICATE OF CORRECTION

PATENT NO. : 5,765,126
DATED : June 9, 1998
INVENTOR(S) : KYOYA TSUTSUI ET AL.

It is certified that error appears in the above-identified patent and that said Letters Patent is hereby corrected as shown below:

In Col. 18, line 42, please replace "components" with --components,--;

In Col. 18, line 47, please replace "block" with --block,--;

In Col. 20, line 25, please replace "short" with --shorter--;

In Col. 21, line 31, please delete "a".

Signed and Sealed this

Sixteenth Day of March, 1999

Attest:

Attesting Officer

Q. TODD DICKINSON

Acting Commissioner of Patents and Trademarks